United States Patent
Kim et al.

(10) Patent No.: US 12,461,712 B2
(45) Date of Patent: Nov. 4, 2025

(54) IN-MEMORY NEAR-DATA APPROXIMATE ACCELERATION

(71) Applicant: The Board of Trustees of the University of Illinois, Urbana, IL (US)

(72) Inventors: Nam Sung Kim, Champaign, IL (US); Hadi Esmaeilzadeh, Atlanta, GA (US); Amir Yazdanbakhsh, Atlanta, GA (US)

(73) Assignees: The Board of Trustees of the University of Illinois, Urbana, IL (US); Georgia Tech Research Corporation, Atlanta, GA (US)

( * ) Notice: Subject to any disclaimer, the term of this patent is extended or adjusted under 35 U.S.C. 154(b) by 1056 days.

(21) Appl. No.: 17/285,409

(22) PCT Filed: Oct. 14, 2019

(86) PCT No.: PCT/US2019/056068
§ 371 (c)(1),
(2) Date: Apr. 14, 2021

(87) PCT Pub. No.: WO2020/081431
PCT Pub. Date: Apr. 23, 2020

(65) Prior Publication Data
US 2021/0382691 A1 Dec. 9, 2021

Related U.S. Application Data

(60) Provisional application No. 62/745,688, filed on Oct. 15, 2018.

(51) Int. Cl.
*G06F 7/544* (2006.01)
*G06F 1/03* (2006.01)
(Continued)

(52) U.S. Cl.
CPC .............. *G06F 7/5443* (2013.01); *G06F 1/03* (2013.01); *G06F 7/527* (2013.01); *G06N 3/04* (2013.01); *G11C 7/1012* (2013.01); *G06F 17/17* (2013.01)

(58) Field of Classification Search
CPC ...... G06F 7/527; G06F 7/5443; G06F 17/153; G06F 17/16; G06F 17/17; G06F 1/03;
(Continued)

(56) References Cited

U.S. PATENT DOCUMENTS 5,530,661 A * 6/1996 Garbe ....................... G06T 5/20
708/319
6,724,684 B2 4/2004 Kim
(Continued)

OTHER PUBLICATIONS

Mohsen Imani et al., "Ultra-Efficient processing In-Memory for Data Intensive Applications", Jun. 18, 2017, pp. 1-6.
(Continued)

*Primary Examiner* — Emily E Larocque
(74) *Attorney, Agent, or Firm* — McDonnell Boehnen Hulbert & Berghoff LLP

(57) ABSTRACT

A random access memory may include memory banks and arithmetic approximation units. Each arithmetic approximation unit may be dedicated to one or more of the memory banks and include a respective multiply-and-accumulate unit and a respective lookup-table unit. The respective multiply-and-accumulate unit is configured to iteratively perform shift and add operations with two inputs and to provide a result of the shift and add operations to the respective lookup-table unit. The result approximates or is a product of the two inputs. The respective lookup-table unit is configured produce an output by applying a pre-defined function to the result. The arithmetic approximation units are configured for parallel operation. The random access memory may also include a memory controller configured to
(Continued)

receive instructions, from a processor, regarding locations within the memory banks from which to obtain the two inputs and in which to write the output.

20 Claims, 14 Drawing Sheets

(51) Int. Cl.
  *G06F 7/527*  (2006.01)
  *G06N 3/04*  (2023.01)
  *G11C 7/10*  (2006.01)
  *G06F 17/17*  (2006.01)
(58) Field of Classification Search
  CPC ........ G06N 3/04; G06N 3/0464; G06N 3/048; G06N 3/063; G11C 7/1012
  See application file for complete search history.

(56) References Cited

U.S. PATENT DOCUMENTS

| | | | |
|---|---|---|---|
| 7,623,134 | B1 | 11/2009 | Danilak |
| 9,710,265 | B1 | 7/2017 | Temam et al. |
| 2008/0028181 | A1 | 1/2008 | Tong et al. |
| 2019/0303749 | A1* | 10/2019 | Appuswamy ............ G06F 17/16 |
| 2020/0201633 | A1* | 6/2020 | Madduri ............... G06F 9/3001 |

OTHER PUBLICATIONS

Gao Di et al., "A Design Framework for Processing-In-Memory Accelerator", 2018 ACM/IEEE International Workshop on System Level Interconnect Prediction (SLIP), ACM, Jun. 23, 2018, pp. 1-6.

Jeon Dong-Ik et al., "HMC-MAC: Processing-in Memory Architecture for Multiply-Accumulate Operations with Hybrid memory Cube", IEEE Computer Architecture Letters, IEEE, US, vol. 17, No. 1, Jan. 1, 2018, pp. 5-8.

International Search Report and Written Opinion dated Jan. 22, 2020 for International Application No. PCT/US2019/056068, 15 pages.

X. Chen, et al., "Adaptive Cache Management for Energy-Efficient GPU Computing," in MICRO, 2014.

Y. Tian, et al., "Adaptive GPU Cache Bypassing," in Proceedings of the 8th Workshop on General Purpose Processing using GPUs, 2015.

M. Carbin, et al., "Verifying Quantitative Reliability for Programs that Execute on Unreliable Hardware," in OOPSLA, 2013.

J. Park, et al., "FlexJava: Language Support for Safe and Modular Approximate Programming," in FSE, 2015.

I. Singh, et al., "Cache Coherence for GPU Architectures," in HPCA, 2013.

Hynix. Hynix GDDR5 SGRAM Part H5GQ1H24AFR Revision 1.0., 2009.

"Nvidia Corporation. CUDA Programming Guide." http://docs.nvidia.com/cuda/cuda-c-programmingguide, 2015.

Jedec, "High Bandwidth Memory DRAM." http://www.jedec.org/standardsdocuments/docs/jesd235, Oct. 2013.

S. W. Keckler, et al., "GPUs and the Future of Parallel Computing," IEEE Micro, vol. 31, No. 5, pp. 7-17, 2011.

J. Mukundan, et al., "Understanding and Mitigating Refresh Overheads in High-density DDR4 DRAM Systems," in ISCA, 2013.

Q. Guo, et al., "AC-DIMM: Associative Computing with STT-MRAM," in ISCA, 2013.

S. M. Hassan, et al., "Near Data Processing: Impact and Optimization of 3D Memory System Architecture on the Uncore," in MEMSYS, 2015.

K. Hsieh, et al., "Transparent Offloading and Mapping (TOM): Enabling Programmer-Transparent Near-Data Processing in GPU Systems," in ISCA, 2016.

B. Akin, et al., "Data Reorganization in Memory using 3D-stacked DRAM," in ISCA, 2015.

Y.-H. Chen, et al., "Eyeriss: A Spatial Architecture for Energy-Efficient Dataflow for Convolutional Neural Networks," in ISCA, 2016.

M. Gao, et al., "TETRIS: Scalable and Efficient Neural Network Acceleration with 3D Memory," 2017.

N. Chatterjee, et al., "Managing DRAM Latency Divergence in Irregular GPGPU Applications," in SC, 2014.

P. Boudier and G. Sellers, "Memory System on Fusion APUs," AMD Fusion developer summit, 2011.

S. Kato, et al., "Gdev: First-Class GPU Resource Management in the Operating System," in USENIX, 2012.

Y. Fujii, et al., "Data Transfer Matters for GPU Computing," in ICPADS, 2013.

J. Power, et al., "Supporting x86-64 Address Translation for 100s of GPU Lanes," in HPCA, 2014.

H. Wong, et al., "Demystifying GPU Microarchitecture through Microbenchmarking," in ISPASS, 2010.

X. Mei and X. Chu, "Dissecting GPU Memory Hierarchy through Microbenchmarking," IEEE Transactions on Parallel and Distributed Systems, No. 99, 2016.

B. Pichai, et al., "Architectural Support for Address Translation on GPUs: Designing Memory Management Units for CPU/GPUs with Unified Address Spaces," in ASPLOS, 2014.

N. Wilt, The CUDA Handbook: A Comprehensive Guide to GPU Programming. Pearson Education, 2013.

T. Beri, et al., "A Scheduling and Runtime Framework for a Cluster of Heterogeneous Machines with Multiple Accelerators," in IPDPS, 2015.

M. Harris, "Inside Pascal: Nvidia's Newest Computing Platform."https://devblogs.nvidia.com/parallelforall/inside-pascal/, 2016.

A. Yazdanbakhsh, et al., "AxBench: A Multi-Platform Benchmark Suite for Approximate Computing," IEEE Design and Test, 2016.

"FreePDK45 and the Nangate Open Cell Library," https://mflowgen.readthedocs.io/en/latest/stdlib-freepdk45.html, 2020.

T. Johnson and D. Shasha, "2Q: A Low Overhead High Performance Buffer Management Replacement Algorithm," in VLDB, 1994.

S. Rixner, "Memory Controller Optimizations for Web Servers," in MICRO, 2004.

S. Rixner, et al., "Memory Access Scheduling," ISCA, 2000.

T. Vogelsang, "Understanding the Energy Consumption of Dynamic Random Access Memories," in MICRO, 2010.

M. O'Connor, "Highlights of the High-Bandwidth Memory (HBM) Standards," in The Memory Forum co-located with ISCA, 2014.

S. Galal, Energy Efficient Floating-Point Unit Design. PhD thesis, The Department of Electrical Engineering of Stanford University, 2012.

J. Leng, et al., "GPUWattch: Enabling Energy Optimizations in GPGPUs," in ISCA, 2013.

S. Li, et al., "McPAT: An Integrated Power, Area, and Timing Modeling Framework for Multicore and Manycore Architectures," in MICRO, 2009.

N. Muralimanohar, et al., "Optimizing NUCA Organizations and Wiring Alternatives for Large Caches with CACTI 6.0," in MICRO, 2007.

Y. H. Son, et al., "Reducing Memory Access Latency with Asymmetric DRAM Bank Organizations," in ISCA, 2013.

K. K. Chang, et al., "Low-Cost Inter-Linked Subarrays (LISA): Enabling fast inter-subarray data movement in DRAM," in HPCA, 2016.

Z. Du, et al., "Leveraging the Error Resilience of Machine-Learning Applications for Designing Highly Energy Efficient Accelerators," in ASP-DAC, 2014.

B. Belhadj, et al., "Continuous Real-World Inputs Can Open Up Alternative Accelerator Designs," in ISCA, 2013.

B. Grigorian and G. Reinman, "Accelerating Divergent Applications on SIMD Architectures using Neural Networks," in ICCD, 2014.

S. Eldridge, et al., "Towards General-Purpose Neural Network Computing," in PACT, 2015.

M. F. Deering, et al., "FBRAM: A New Form of Memory Optimized for 3D Graphics," in SIGGRAPH, 1994.

(56) References Cited

OTHER PUBLICATIONS

J. Draper, et al., "The Architecture of the DIVA Processing-in-Memory Chip," in Supercomputing, 2002.
D. Patterson, et al., "A Case for Intelligent RAM," Micro, IEEE, vol. 17, No. 2, 1997.
D. G. Elliott, et al., "Computational RAM: A Memory-SIMD Hybrid and its Application to DSP," in Custom Integrated Circuits Conference, vol. 30, 1992.
Y. Kang, et al., "FlexRAM: Toward an Advanced Intelligent Memory System," in ICCD, 2012.
K. Mai, et al., "Smart Memories: A Modular Reconfigurable Architecture," in ISCA, 2000.
M. Oskin, et al., "Active Pages: a Computation Model for Intelligent Memory," in ISCA, 1998.
L. Nai, et al., "GraphPIM: Enabling Instruction-Level PIM Offloading in Graph Computing Frameworks," in HPCA, 2017.
D. Zhang, et al., "TOP-PIM: Throughput-Oriented Programmable Processing in Memory," in HPDC, 2014.
J. Ahn, et al., "A Scalable Processing-in-Memory Accelerator for Parallel Graph Processing," in ISCA, 2015.
S. Pugsley, et al., "Comparing Implementations of Near-Data Computing with In-Memory MapReduce Workloads," Micro, IEEE, vol. 34, No. 4, 2014.
R. Nair, et al., "Active Memory Cube: A Processing-in-Memory Architecture for Exascale Systems," IBM Journal of Research and Development, vol. 59, No. 2/3, 2015.
Q. Guo, et al., "3D-Stacked Memory-Side Acceleration: Accelerator and System Design," in WoNDP, 2014.
C. Shelor, et al., "Dataflow based Near Data Processing using Coarse Grain Reconfigurable Logic," in WoNDP, 2015.
Q. Zhu, et al., "Accelerating Sparse Matrix-Matrix Multiplication with 3D-Stacked Logic-in-Memory Hardware," in HPEC, 2013.
M. Gao and C. Kozyrakis, "HRL: Efficient and Flexible Reconfigurable Logic for Near-Data Processing," in HPCA, 2016.
A. Farmahini-Farahani, et al., "DRAMA: An Architecture for Accelerated Processing Near Memory," CAL, vol. 14, No. 1, 2015.
D. Kim, et al., "NeuroCube: A Programmable Digital Neuromorphic Architecture with High-Density 3D Memory," in ISCA, 2016.
T. P. Morgan, "Accelerating Compute by Cramming it into DRAM Memory," TheNextPlatform, Oct. 3, 2019.
B. M. Rogers, et. al., "Scaling the Bandwidth Wall: Challenges in and Avenues for CMP Scaling," in ISCA, 2009.
A. Yazdanbakhsh, et. al., "RFVP: Rollback-Free Value Prediction with Safe to Approximate Loads," in TACO, 2015.
N. Vijaykumar, et. al., "A Case for Core-Assisted Bottleneck Acceleration in GPUs: Enabling Efficient Data Compression," in ISCA, 2015.
B. Casper, "Energy Efficient Multi-GB/s I/O: Circuit and System Design Techniques," in IEEE Workshop on Microelectronics and Electron Devices, 2011.
M. Horowitz, "CS 598sm Probabilistic & Approximate Computing," http://misailo.web.engr.Illinois.edu/courses/cs598.
S. Han, et. al., "Deep Compression: Compressing Deep Neural Networks with Pruning, Trained Quantization, and Huffman Coding," in ICLR, 2016.
S. Han, et. al., "Learning both Weights and Connections for Efficient Neural Network," in NIPS, 2015.
A. Farmahini-Farahani, et. al., "NDA: Near-DRAM Acceleration Architecture Leveraging Commodity DRAM Devices and Standard Memory Modules," in HPCA, 2015.
R. Sampson, et. al., "Sonic Millip3De: A Massively Parallel 3D-stacked Accelerator for 3D Ultrasound," in HPCA, 2013.
R. Hou, et. al., "Efficient Data Streaming with On-chip Accelerators: Opportunities and Challenges," in HPCA, 2011.
H. Asghari-Moghaddam, et. al., "Chameleon: Versatile and Practical Near-DRAM Acceleration Architecture for Large Memory Systems," in MICRO, 2016.
D. U. Lee, et. al., "25.2 A 1.2V 8Gb 8-Channel 128GB/s High-Bandwidth Memory (HBM) Stacked DRAM with Effective Microbump I/O Test Methods using 29nm Process and TSV," in ISSCC, 2014.
S. Liu, et. al., "Hardware/Software Techniques for DRAM Thermal Management," in HPCA, 2011.
J. Iyer, et. al., "System Memory Power and Thermal Management in Platforms Build on Intel Centrino Duo Technology," Intel Technology Journal, vol. 10, No. 2, 2006.
D. Kanter, A Preview of Intel's Bensley Platform (Part I), Real World Tech, Nov. 8, 2005.
J. Lin, et. al., "Thermal Modeling and Management of DRAM Memory Systems," in ISCA, 2007.
J. Lin, et. al., "Software Thermal Management of DRAM Memory for Multicore Systems," SIGMETRICS, vol. 36, No. 1, pp. 337-348, 2008.
J. Lin, et. al., "Thermal Modeling and Management of DRAM Systems," IEEE Transactions on Computers, vol. 62, No. 10, pp. 2069-2082, 2013.
K. Koo, et. al., "A 1.2V 38nm 2.4Gb/s/pin 2Gb DDR4 SDRAM with Bank Group and x4 Half-Page Architecture," in ISSCC, pp. 40-41, 2012.
T. Y. Oh, et. al., "A 7 Gb/s/pin 1 Gbit GDDR5 SDRAM With 2.5 ns Bank to Bank Active Time and No Bank Group Restriction," JSSC, vol. 46, No. 1, pp. 107-118, 2011.
T. Y. Oh, et. al., "A 7Gb/s/pin GDDR5 SDRAM with 2.5ns Bank-to-Bank Active Time and no Bank-group Restriction," in ISSCC'10.
H. Esmaeilzadeh, et. al. , "Neural Acceleration for General-Purpose Approximate Programs," in MICRO, 2012.
R. S. Amant, et. al., "General-Purpose Code Acceleration with Limited-Precision Analog Computation," in ISCA, 2014.
A. Yazdanbakhsh, et. al., "Neural Acceleration for GPU Throughput Processors," in MICRO, 2015.
B. Grigorian, et. al., "BRAINIAC: Bringing Reliable Accuracy Into Neurally-Implemented Approximate Computing," in HPCA, 2015.
T. Moreau, et. al., "SNNAP: Approximate Computing on Programmable SoCs via Neural Acceleration," in HPCA, 2015.
V. Govindaraju, et. al., "DySER: Unifying Functionality and Parallelism Specialization for Energy-Efficient Computing," EEE Micro, vol. 32, No. 5, pp. 38-51, 2012.
W. Baek and T. M. Chilimbi, "Green: A Framework for Supporting Energy-Conscious Programming using Controlled Approximation," in PLDI, 2010.
M. Samadi, et. al., "SAGE: Self-Tuning Approximation for Graphics Engines," in MICRO, 2013.
M. Samadi, et. al., "Paraprox: Pattern-based Approximation for Data Parallel Applications," in ASPLOS, 2014.
S. Sidiroglou-Douskos, et. al., "Managing Performance vs. Accuracy Trade-offs with Loop Perforation," in FSE, 2011.
S. Misailovic, et. al., "Quality of Service Profiling," in ICSE, 2010.
M. Rinard, et. al., "Patterns and Statistical Analysis for Understanding Reduced Resource Computing," in Onward!, 2010.
L. McAfee and K. Olukotun, "EMEURO: A Framework for Generating Multi-Purpose Accelerators via Deep Learning," in CGO, 2015.
B. Grigorian and G. Reinman, "Accelerating Divergent Applications on SIMD Architectures Using Neural Networks," ACM Trans. Archit. Code Optim., vol. 12, pp. 2:1-2:23, Mar. 2015.
H. Esmaeilzadeh, et. al., "Architecture Support for Disciplined Approximate Programming," in ASPLOS, 2012.
L. N. Chakrapani, et. al., "Ultra-efficient (Embedded) SOC Architectures based on Probabilistic CMOS (PCMOS) Technology," in Date, 2006.
L. Leem, et. al., "ERSA: Error Resilient System Architecture for Probabilistic Applications," in Date, 2010.
J. Sartori and R. Kumar, "Branch and Data Herding: Reducing Control and Memory Divergence for Error-Tolerant GPU Applications," Multimedia, IEEE Transactions on, vol. 15, No. 2, 2013.
A. Sampson, et. al., "EnerJ: Approximate Data Types for Safe and General Low-Power Computation," in PLDI, 2011.
A. Yazdanbakhsh, et. al., "Axilog: Language Support for Approximate Hardware Design," in Date, 2015.
A. Ranjan, et. al., "ASLAN: Synthesis of Approximate Sequential Circuits," in Date, 2014.
S. Venkataramani, et. al., "SALSA: Systematic Logic Synthesis of Approximate Circuits," in DAC, 2012.

(56) References Cited

OTHER PUBLICATIONS

K. Nepal, et. al., "ABACUS: A Technique for Automated Behavioral Synthesis of Approximate Computing Circuits," in Data, 2014.
A. Lingamneni, et. al., "Synthesizing Parsimonious Inexact Circuits Through Probabilistic Design Techniques," ACM Trans. Embed. Comput. Syst., vol. 12, No. 2s, 2013.
A. Lingamneni, et. al., "Algorithmic Methodologies for Ultra-efficient Inexact Architectures for Sustaining Technology Scaling," in CF, 2012.
T. G. Rogers, et. al., "Cache-Conscious Wavefront Scheduling," in MICRO, 2012.
A. Bakhoda, et. al., "Analyzing CUDA Workloads using a Detailed GPU Simulator," in ISPASS, 2009.
B. Pichai, et. a., "Architectural Support for Address Translation on GPUs: Designing Memory Management Units for CPU/GPUs with Unified Address Spaces," in ACM SIGARCH Computer Architecture News, vol. 42, pp. 743-757, 2014.
H. Jooybar, et. al., "GPUDet: A Deterministic GPU Architecture," in ASPLOS, 2013.

\* cited by examiner

IN-MEMORY NEAR-DATA APPROXIMATE ACCELERATION

CROSS-REFERENCE TO RELATED APPLICATION

This application is a U.S. national phase application of International Patent Application no. PCT/US2019/056068, filed Oct. 14, 2019. International Patent Application no. PCT/US2019/056068 claims priority to U.S. provisional patent application No. 62/745,688, filed Oct. 15, 2018, which is hereby incorporated by reference in its entirety.

BACKGROUND

Graphical processing units (GPUs) have emerged as one of the leading computing platforms, as data intensive workloads gain prevalence across different domains—from artificial intelligence to medical prognosis. They are architected to exploit large-scale data-level parallelism in these workloads through simultaneous many-thread execution. However, this throughput processing model is hindered by memory bandwidth and bottlenecked by overwhelming numbers of concurrent memory requests. Yet, package pin and power constraints make it challenging to offer higher bandwidth. Moreover, raising the pin data transfer rate deteriorates signal integrity and superlinearly increases power. Additionally, the data transfer energy cost is orders of magnitude higher than on-chip data processing.

These limitations make near-data acceleration alluring for GPUs. However, their many-thread execution model necessitates integrating a rather large number of accelerators close to the data. Additionally, the efficacy and utility of near-data integration depends upon providing higher bandwidth to the many accelerators. There are two main options for such an integration: (1) 3D/2.5D stacking and (2) integration within dynamic random access memory (DRAM).

The former option can incur a significant cost to expose higher internal bandwidth to 3D/2.5D-stacked accelerators than the external bandwidth exposes to the GPU. For example, to provide 2 times higher bandwidth to the logic layer of High Bandwidth Memory (HBM) compared with the external bandwidth, each 3D-stacked HBM layer requires 2 times more through-silicon vias (TSVs). However, the TSVs for standard HBM can consume nearly 20% of each 3D-stacked layer.

Alternatively, the latter option exposes the accelerators to the higher internal bandwidth of DRAM. Such a tight integration can be attractive if it incurs little overhead (e.g., a few percent of DRAM space). However, integrating many complex accelerators within DRAM is not practical, since DRAM is under tight area, power, and thermal constraints. Moreover, even the number of metal layers for routing is limited, which can severely hinder integrating complex accelerators. Finally, it is highly desirable to avoid changing the innards of DRAM banks, as they have been optimized over decades of engineering.

SUMMARY

The embodiments herein address these challenges by exploiting the approximability of many applications. This involves use of the neural transformation, which can accelerate diverse applications by approximating regions of code and converting them into a neural representation comprised of only two types of operations: Multiply-and-ACcumulate (MAC) and Look-Up Table (LUT) accesses. Hence, the accelerator architecture becomes relatively simple. To further reduce the power and area overhead and enable a low-overhead integration of many in-DRAM accelerators, the MAC units use approximation. Specifically, these approximate MAC units convert the multiplication into limited iterations of shift-add and LUT access operations with early termination by exploiting a unique property of neural transformation, i.e., one of the operands for each MAC operation is fixed. While the accelerators merely comprise simple shift, add, and LUT access operations, they are able to support a wide variety of applications. These simplified units are attached to the wide data lines, which connect the DRAM banks to the global I/O, to avoid altering the banks and memory column pitch. Due to its low overhead, these embodiments may be used as the building layer of 3D/2.5D-stacked DRAM to support in-DRAM acceleration without increasing the number of costly logic layers and/or TSVs. As such, this work defines AXRAM, a novel accelerated DRAM architecture, and provides numerous improvements and advantages.

First, the approximations simplify in-DRAM acceleration. Approximation can significantly simplify the in-DRAM accelerator microarchitecture to only support MAC and LUT operations while handling a diverse range of applications. As such, the AXRAM architecture converges two disjoint lines of research: approximate computing and near-data processing.

Second, the simplified MAC operation enables in-DRAM integration. MAC operations can be approximated by limited iterations of shift-add and LUT operations with early termination. This insight leads to a design that integrates many accelerators in each DRAM chip with low area and power overhead. These simplified accelerators are placed and routed with only three metal layers to more accurately model in-DRAM integration.

Third, the neural transformation is leveraged to provide a simple yet efficient data organization which is effective in improving the DRAM row-buffer hit rate. Experimental results show that the proposed data organization, on average, improves the DRAM row-buffer hit rate by 2.6 times, which translates to a reduction in the average energy consumption of the DRAM system.

Fourth, evaluations show substantial gains with modest overheads. The in-DRAM integration of many simplified arithmetic units merely adds 2.1% area overhead, whereas integrating the same number of Coarse Grain Reconfigurable Accelerators (CGRAs) would have imposed a ≈55% area overhead. The breakdown of DRAM system power with the simplified arithmetic unit shows 26% reduction in the power, which is mainly attributed to higher row-buffer hit rate and reduced DRAM I/O activity. Naïvely integrating floating-point MAC units would have increased the overall DRAM system power by 70%. Cycle-accurate simulations with a diverse set of benchmarks shows 2.6 times and 1.1 times speedups and 13.4 times and 4.8 times energy reduction over the baseline GPU with no acceleration and a neurally accelerated GPU (NGPU), respectively.

Furthermore, while the conventional neurally accelerated GPUs increase the bandwidth pressure, AXRAM reduces the GPU off-chip bandwidth utilization by 7.3 times and 16 times as compared to a baseline GPU and a neurally accelerated GPU, respectively. These results show that AXRAM effectively leverages approximation to interweave computation within memory, exploit the high internal bandwidth of DRAM, and reduce the GPU off-chip bandwidth pressure. AXRAM takes approximation in a novel direction of bringing computation closer to data, which leads to even higher benefits compared to the myriad of past works that merely focused on shortening the data processing time.

While the embodiments herein describe aspects of the invention in terms of accelerating GPU calculations, non-GPU calculations can also be accelerated by these embodiments. Thus, a central processing unit (CPU), otherwise referred to as a "processor" or "microprocessor" may also benefit from these embodiments. Furthermore, while the invention's benefits are described in terms of accelerating neural network calculations, any type of calculations that can be performed with the MAC and LUT structure defined herein can also benefit from these embodiments.

Accordingly, a first example embodiment may involve a random access memory. The random access memory may include: (i) a plurality of memory banks; (ii) a plurality of arithmetic approximation units, each dedicated to one or more of the memory banks and including a respective multiply-and-accumulate unit and a respective lookup-table unit, wherein the respective multiply-and-accumulate unit is configured to iteratively perform shift and add operations with two inputs and to provide a result of the shift and add operations to the respective lookup-table unit, wherein the result approximates or is a product of the two inputs, wherein the respective lookup-table unit is configured produce an output by applying a pre-defined function to the result, and wherein the arithmetic approximation units are configured for parallel operation; and (iii) a memory controller configured to receive instructions, from a processor, regarding locations within the memory banks from which to obtain the two inputs and in which to write the output.

A second example embodiment may involve receiving, by an arithmetic approximation unit and from a memory bank, two inputs, wherein the arithmetic approximation unit includes a multiply-and-accumulate unit and a lookup-table unit, and wherein the arithmetic approximation unit and the memory bank are both disposed within a random access memory. The second example embodiment may also involve iteratively performing, by the multiply-and-accumulate unit, shift and add operations with the two inputs. The second example embodiment may also involve providing, by the multiply-and-accumulate unit, a result of the shift and add operations to the lookup-table unit, wherein the result approximates or is a product of the two inputs. The second example embodiment may also involve producing, by the lookup-table unit, an output by applying a pre-defined function to the result. The second example embodiment may also involve storing, in the memory bank, the output.

A third example embodiment may involve a processor and a random access memory. The random access memory may include: (i) a memory bank, and (ii) a plurality of arithmetic approximation units, each dedicated the memory bank and including a respective multiply-and-accumulate unit and a respective lookup-table unit, wherein the respective multiply-and-accumulate unit is configured to iteratively perform shift and add operations with two inputs and to provide a result of the shift and add operations to the respective lookup-table unit, wherein the result approximates or is a product of the two inputs, wherein the respective lookup-table unit is configured produce an output by applying a pre-defined function to the result, and wherein the arithmetic approximation units are configured for parallel operation; and (iii) a memory controller configured to receive instructions, from the processor, regarding locations within the memory bank from which to obtain the two inputs and in which to write the output.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

Before proceeding into the details of AXRAM, the following discussion covers the challenges and opportunities of in-DRAM acceleration for processors and how approximation plays an enabling role.

A. Challenges and Opportunities

Off-chip data transfer imposes a significant energy cost relative to data processing. With a 45 nm process, a 32-bit floating-point addition costs about 0.9 picojoules (pJ), while a 32-bit DRAM memory access costs about 640 pJ. As such, off-chip data transfer consumes over 700 times more energy than on-chip data processing. This cost becomes even more pronounced in GPU applications, since they typically stream data and exhibit low temporal locality (i.e., high cache miss rates). Near-data processing provides an opportunity to cut down this cost.

Figure 1A:
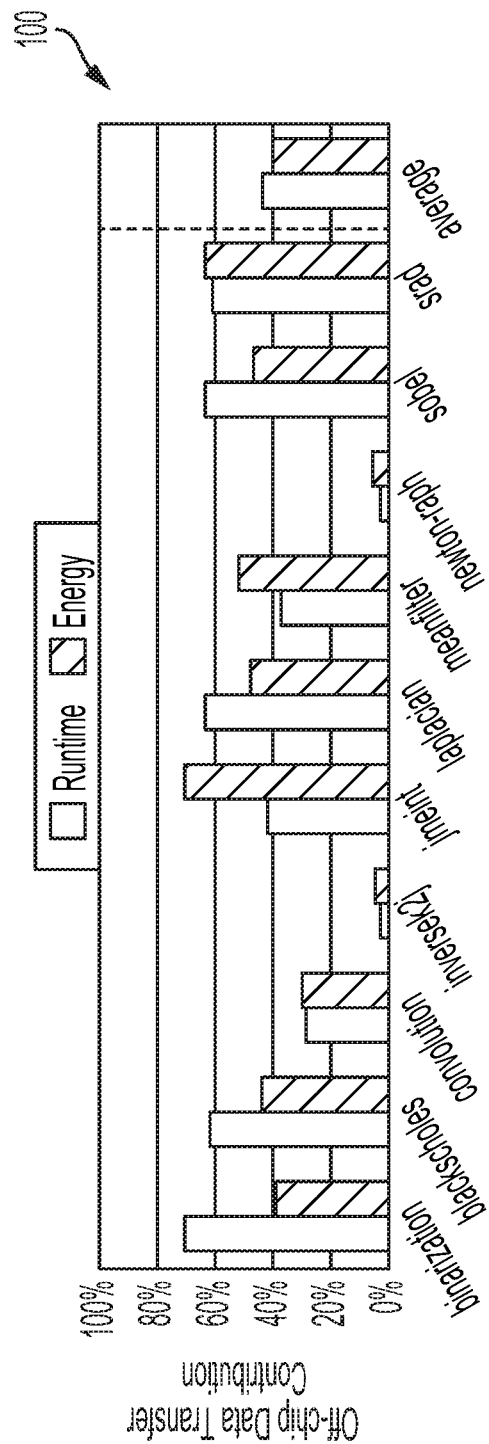
FIG. 1A illustrates the fraction of total application runtime and energy spent in off-chip data transfer for a baseline GPU, in accordance with example embodiments.

To concretely examine the potential benefits of near-data processing, a study was conducted to separate the fraction of runtime and energy consumption spent on off-chip data transfer. As chart 100 of FIG. 1A illustrates, on average, applications spend 42% of their runtime and 39% of their energy dissipation on off-chip data transfer on a GPU.

Figure 1B:
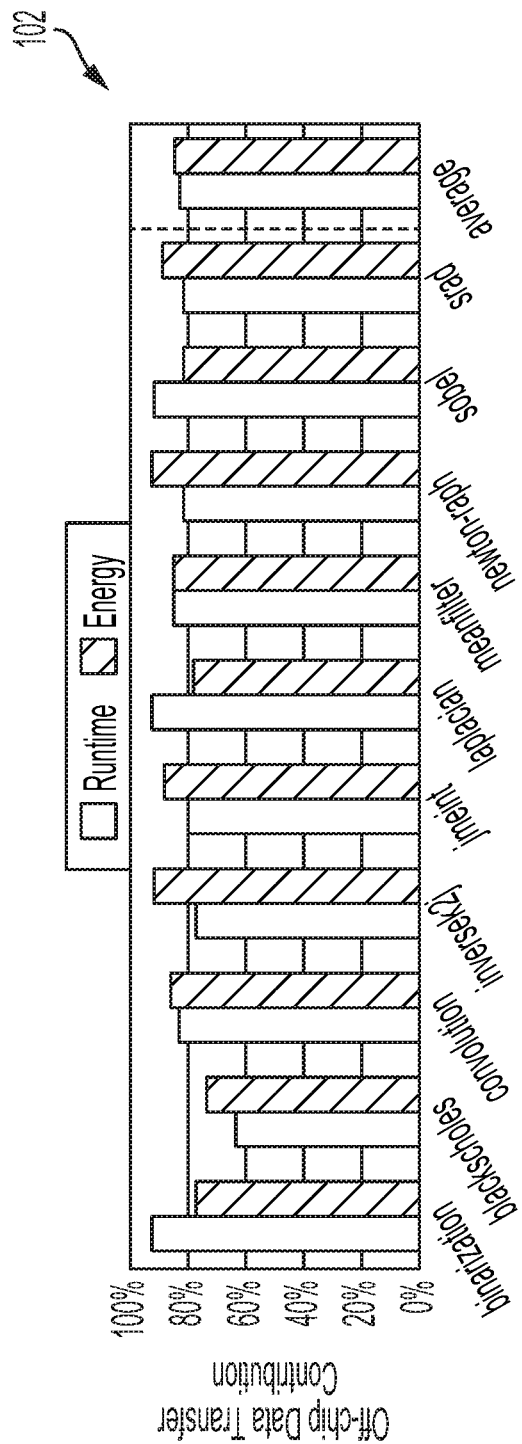
FIG. 1B illustrates the fraction of total application runtime and energy spent in off-chip data transfer for an accelerated GPU, in accordance with example embodiments.

In chart 102 of FIG. 1B, the trend is further examined for a neurally accelerated GPU, NGPU, to speed up the data processing portion of each thread. The acceleration reduces the data processing time of each thread, in turn increasing the rate of accesses to off-chip memory. This increased rate exacerbates the contribution of data transfer to the application runtime and energy. Moreover, accelerating the GPU further compounds the already significant pressure on the off-chip communication bandwidth. On average, applications spend 83% of their runtime and 85% of their energy on off-chip data transfer on NGPU. These results indicate a significant opportunity for near-data processing to address the overhead of off-chip data transfer in GPUs.

GPUs present unique challenges for near-data processing, as they comprise many cores simultaneously running many threads. To preserve the single-instruction multiple-threads (SIMT) execution model of GPUs, many accelerator units may be integrated near the data. There are two options for where to integrate the accelerator units: (1) the on-chip memory controller or (2) inside the DRAM itself.

Option (1) provides the accelerator units with no additional bandwidth, as the on-chip memory controller receives the same bandwidth from memory as the rest of the GPU. Furthermore, placing the accelerator units in the memory controller only circumvents data transfer through the on-chip caches. In addition, integration within the memory controller requires large buffers for holding the accelerators' data, which would impose a significant area overhead.

Option (2), which integrates the accelerators in DRAM, reduces the data transfer distance and exploits the high internal bandwidth of the memory. Moreover, integrating the accelerators in DRAM enables utilization of DRAM as buffers for the accelerators' data. However, this design can introduce a substantial area and power overhead to the space-limited and power-constrained DRAM. In the embodiments herein, the accelerator units are integrated in DRAM and leverage the approximability of many GPU applications to significantly simplify the accelerator architecture. These simplifications enable the accelerator to limit changes to the underlying DRAM architecture and overhead to the DRAM power consumption.

B. Approximation for Near-Data Processing

Among approximation techniques, the neural transformation is an attractive, yet previously unexplored, approach for near-data processing in DRAM. The neural transformation converts a code segment into a neural representation comprising only two operations: multiply-and-accumulate (MAC) and the sigmoid function, $s(x)=1/(1+e^{-x})$. Reducing computation to two operations provides an opportunity to significantly simplify the accelerator. This simplified design minimizes changes to the DRAM and can be replicated many times to preserve the GPUs' SIMT execution model.

Figures 2A, 2B:
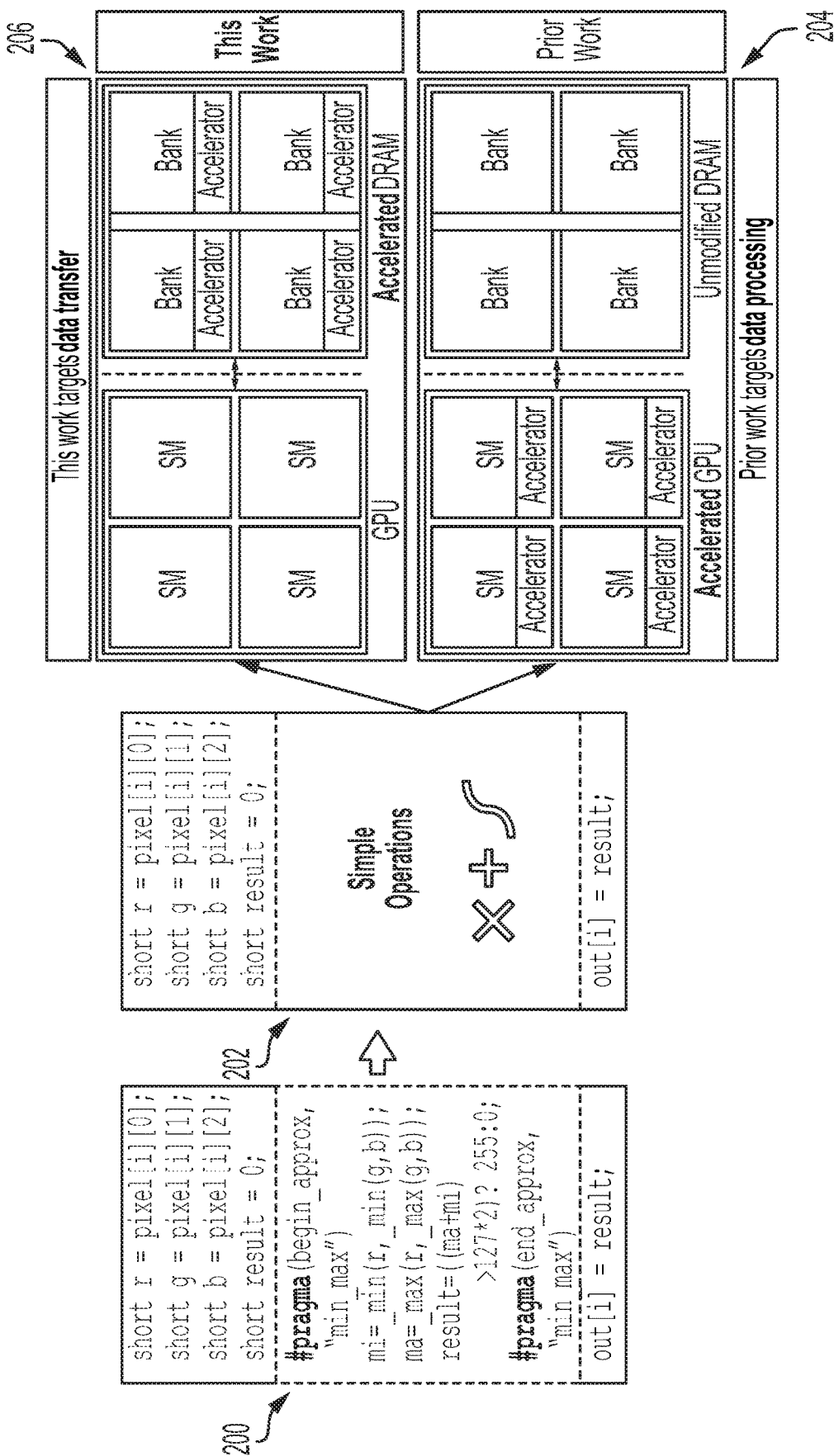
FIG. 2A illustrates the neural transformation of a code segment from the binarization benchmark, in accordance with example embodiments.
FIG. 2B illustrates a comparison of prior work and the example embodiments herein.

The neural transformation trains a neural network to replace an approximable region of conventional code. FIG. 2A illustrates the transformation of a code segment, where the approximable region 200 is highlighted in gray. An approximable region is a segment that, if approximated, will not lead to any catastrophic failures (e.g., a segmentation fault). Such an approximation gracefully degrades the application output quality. As is customary in approximate computing, the programmer may annotate the code region(s) that can be safely approximated. The compiler then automatically performs the transformation and replaces the code segment with a neural hardware invocation 202.

As shown in FIG. 2B, prior work 204 addresses data processing by integrating neural accelerators within the GPU cores and defines a neurally accelerated architecture for GPUs (NGPU). The embodiments herein, on the other hand, develop a neurally accelerated architecture for DRAM 206, dubbed AXRAM, which addresses off-chip data transfer. Moving the neural acceleration to memory enables AXRAM to reduce the data transfer overhead and supply more bandwidth to the accelerators. Moreover, these embodiments leverage the approximability of the GPU applications to further simplify the architecture of the accelerator units. A high-level description of the proposed modifications and execution flow are provided below.

II. IN-DRAM APPROXIMATE ACCELERATION

This section discusses the execution flow and instruction set architecture (ISA) extensions which enable the integration of AXRAM with the GPU's SIMT execution model. Unlike prior work, AXRAM is disjoint from the processor core and is instead integrated into DRAM. Hence, the ISA extensions enable the on-chip memory controller to configure and initiate the in-DRAM accelerator.

A. Neural Acceleration of GPU Warps

GPU applications consist of one or more kernels, which are executed by each of the GPU threads. Threads are executed on GPU processing cores called streaming multiprocessors (SMs), which divide the threads into small groups called warps. A warp executes the same instruction of the same kernel in lock-step but with different input data. The neural transformation approximates segments of the GPU kernels and replaces the original instructions of these segments with the computation of a neural network, as shown in diagram 300 of FIG. 3. A neurally accelerated warp computes the same neural network, one neuron at a time, across all the threads for different inputs. Due to the neural transformation, this computation only consists of MAC and lookup (sigmoid) operations.

Specifically, the output y of each neuron is given by y=sigmoid($\Sigma_i(w_i \times in_i)$), where $in_i$ is the input to the neuron and $w_i$ is the weight of the connection. The neural computation portion of the threads is offloaded to the in-DRAM neural accelerator. Instructions that invoke and configure the in-DRAM neural accelerator are added to the GPU's ISA. These instructions are added by the compiler to the accelerated kernel and are executed by the threads in SIMT mode like other GPU instructions. Thus, the accelerated warp comprises both the normal precise instructions of the unmodified code segments and approximate instructions which communicate with the in-DRAM accelerator.

B. Execution Flow with AXRAM

Figure 3:
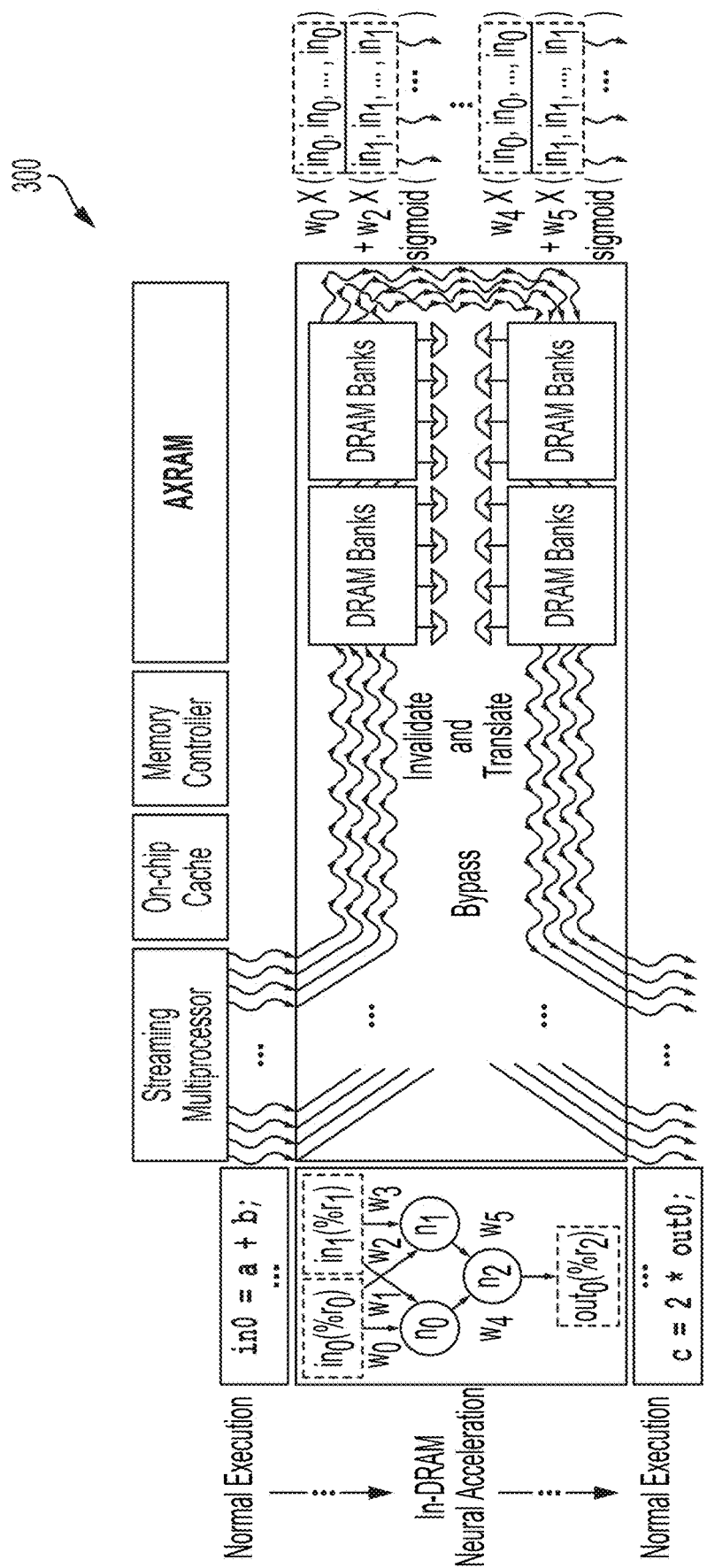
FIG. 3 illustrates the execution flow of the accelerated GPU code on the in-DRAM accelerator, in accordance with example embodiments.

FIG. 3 illustrates the execution flow of the neurally accelerated warp and communication amongst the GPU, on-chip memory controller, and in-DRAM neural accelerator in one graphics double data rate type five (GDDR5) chip. It is assumed that all data for the neural computation of a given warp is located on one GDDR5 chip. This assumption is enabled by a series of data organization optimizations discussed below.

First, the SM fetches the warp and begins the execution of the precise instructions normally without any in-DRAM acceleration. The warp then reaches the approximable region, which instructs the SM to send an initiation request directly to the on-chip memory controller. Once the initiation request has been sent, the issuing warp goes into halting mode. This is not an active warp waiting mechanism but is similar to a load miss in the cache. The core may switch to the execution of another warp while the in-DRAM neural computation proceeds, provided the warp does not have any conflicts with the ongoing in-DRAM computation.

Augmented logic in the on-chip memory controller first sends invalidate signals to the on-chip caches and nullifies dirty data to be modified by the neural computation. The invalidate signals are sufficient to prevent GPU cores from using stale data. As most GPU caches use a write-through policy, it is guaranteed that in-DRAM accelerators have access to the most up-to-date data. The cache coherency mechanism of AXRAM is explained below.

Next, the on-chip memory controller configures and initiates the in-DRAM accelerators of FIG. 3. Specifically, the on-chip memory controller translates the initiation request and instructs the in-DRAM accelerator where the inputs to the neural network are located in memory and to where the accelerator should store its final outputs. Furthermore, the on-chip memory controller blocks any other memory commands to that particular DRAM chip to ensure the atomicity of the in-DRAM neural computation. The on-chip memory controller also does not assign any other neural computations to a GDDR5 chip with an ongoing neural computation. A simple on-chip queue per memory controller keeps track of in-flight requests for in-DRAM approximate acceleration. The area overhead of these queues to the GPU die is modest (≈1%). The on-chip memory controller allows critical memory operations such as refreshing to be performed during in-DRAM neural computation.

During neural computation, the in-DRAM accelerator takes full control of accessing and issuing commands to the banks. The in-DRAM accelerator carries out the MAC and sigmoid operations, as depicted by FIG. 3. Neural computation for the threads of the neurally accelerated warp is performed in lock-step by the many integrated arithmetic units. Once neural computation is completed, the in-DRAM accelerator writes its results to the banks in locations dictated by the memory controller.

There are two options for notifying the GPU that in-DRAM computation has completed: waiting a fixed number of cycles and polling. The former approach involves pre-determining the execution time of each invocation and exposing that to the compiler. The memory controller would then wait for this pre-determined number of cycles before notifying the warp to continue precise execution. However, the execution time of an in-DRAM invocation depends on both the neural network topology and the accelerator's DRAM accesses patterns. Anticipating the DRAM's accesses patterns necessitates exposing DRAM microarchitectural parameters to the compiler. These details are not always readily available, making this design point less desirable.

In the polling approach, the accelerator sets the DRAM memory-mapped mode register MR0 accordingly (e.g., when the computation completes). The on-chip memory controller periodically polls this register to determine if the computation has finished. Once it detects that the register has been set, the on-chip memory controller notifies the GPU that the neural computation for the specific warp is done and the warp can continue precise execution. To enable the on-chip memory controller to properly initiate and configure the in-DRAM accelerator, the ISA is extended with instructions that communicate the configuration data.

C. ISA Extensions for AXRAM

To communicate with AXRAM, the ISA is augmented with three instructions that bypass the on-chip caches and communicate directly with the memory controller. The ISA extensions are as follows:

config.axram [% start_addr], [% end_addr]: This instruction reads the preloaded neural network configuration from the memory region [% start_addr] to [% end_addr] and sends it to the in-DRAM accelerator. The configuration includes both the weight values and the topology of the neural network.

initiate.axram [% start_addr], [% end_addr]: This instruction sends the start ([% start_addr]) and end ([% end_addr]) addresses of a continuous memory region which constitutes the neural network inputs for the warp and then initiates the in-DRAM accelerator.

wrt_res.axram [% start_addr], [% end_addr]: This instruction informs the in-DRAM accelerator to store the computed value(s) of the neural computation in a continuous memory region defined by the start ([% start_addr]) and end ([% end_addr]) addresses.

The dimensionality of the different neural network layers is statically identified at compile time and used to configure the in-DRAM accelerator. Thus, the in-DRAM accelerator knows how many neurons to expect per layer, and specifying the memory regions is sufficient to ensure proper execution. However, this means that input order is important and involves a series of data organization optimizations to ensure correct execution. As with other GPU instructions, these ISA extensions are executed in SIMT mode. That is, each thread in a warp will communicate its input and output data regions to the in-DRAM neural accelerator.

Additionally, the weights and the topology of each neural network are embedded by the compiler in the ".data" section of the ELF-formatted compute unified device architecture (CUDA) binary code (also referred to as cubin) during compilation. Along with the CUDA binary code, the weight values and the topology of the trained neural network are copied in a pre-allocated memory region. Using the config.axram instruction, the in-DRAM accelerator preloads these weights and topology configuration of the trained neural network from memory before starting the neural computation. These ISA extensions unify the execution flow of AXRAM and the GPU. The microarchitectural modifications to the DRAM need to support such a unified execution flow while minimizing changes to the DRAM architecture.

III. AXRAM MICROARCHITECTURE DESIGN

A GDDR5 DRAM architecture is used to embody the design, as it is one of the most common GPU memory architectures. But other architectures may be used. Since high bandwidth memory (HBM) generally stacks GDDR5-like DRAM, the modifications herein can potentially be extended to such memory architectures. Furthermore, AXRAM is appropriate for these 3D-stacked structures, because, as the evaluations show, the design does not increase the DRAM power consumption due to data transfer. The main design objectives are to (1) preserve the SIMT execution model, while (2) keeping the modifications to the baseline GDDR5 minimal and (3) leveraging the high internal bandwidth of DRAM. AXRAM achieves these goals by integrating many simple arithmetic and sigmoid units into GDDR5.

A. Background: GDDR5 Architecture

While GDDR5 has a I/O bus width of 32 bits per chip, it has a much higher internal bus width of 256 bits per bank. This provides an 8 times higher bitwidth that would significantly benefit GPUs, which already place significant pressure on the off-chip bandwidth. Furthermore, the bank-group organization of GDDR5 provides intrinsic parallelism which can be leveraged to feed data to a large number of arithmetic units. By exploiting the attribute of the bank-group organization, 1024 bits of internal bus width (32 times higher bitwidth than the I/O bus) can be utilized.

Figure 4A:
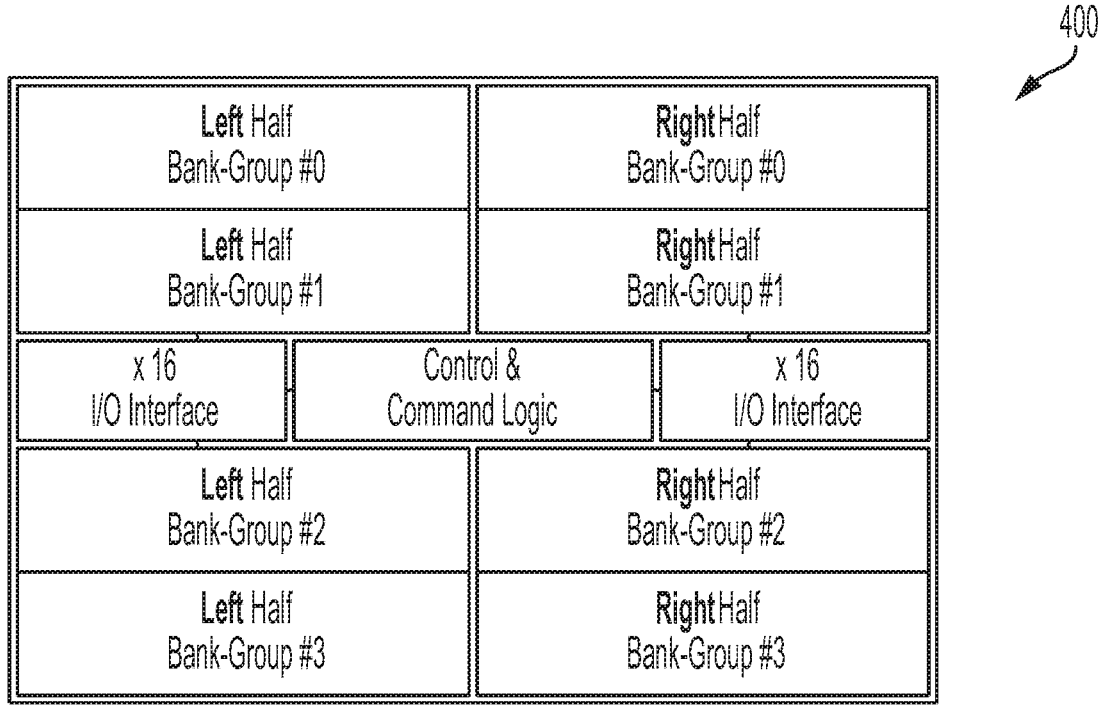
FIG. 4A illustrates high-level GDDR5 DRAM organization, in accordance with example embodiments.

Diagram 400 of FIG. 4A shows the GDDR5 DRAM architecture, which consists of four bank-groups, each with four banks. Each bank-group can operate independently, meaning requests to different bank-groups can be interleaved. The bank-groups are organized into upper and lower pairs partitioned by the I/O interface and control and command logic. Moreover, each bank-group contains four banks that are subdivided into two half-banks, for a total of eight half-banks per bank-group. Subdividing the banks splits each bank-group into a left and right half, each with four half-banks.

Figure 4B:
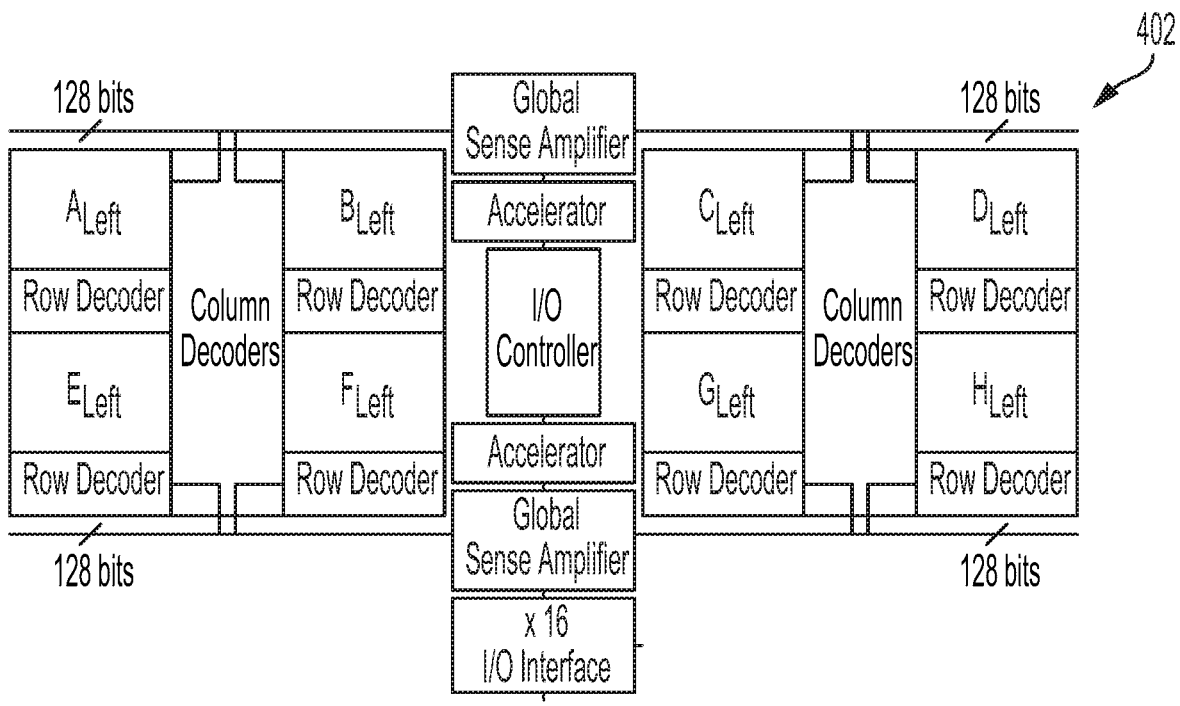
FIG. 4B illustrates the layout of two half bank-groups (Left Half Bank-Group #0 and Left Half Bank-Group #1) and the accelerators, in accordance with example embodiments.

Two upper-left half bank-groups (i.e., Left Half Bank-Group #0 and Left Half Bank-Group #1) are depicted in diagram 402 of FIG. 4B. In each half bank-group, the four half-banks are split into pairs (e.g., $A_{Left}$ and $B_{Left}$ vs. $C_{Left}$ and $p_{Left}$) by a global sense amplifier and shared I/O controller. Each half-bank has its own row decoder, while column decoders are shared between the half-bank pairs of the two adjacent half bank-groups. Both the right and left half bank-groups provide a bus width of 128 bits for a total of 256 bits. However, this higher internal bus width is serialized out through the right and left 16-bit I/O interface.

For instance, when the DRAM receives a memory command to access Bank A in Bank-Group #0, both the half-banks, $A_{Left}$ and $A_{Right}$, process the command in unison to supply the data. For the sake of simplicity, consider the left half of Bank-Group #0 shown in FIG. 4B. The global row decoder of the half-bank decodes the address and accesses the data. The shared column decoder asserts the column select lines, which drives the data onto a 128-bit global dataline shared between half-banks $A_{Left}$ and $B_{Left}$. Since the global dataline is shared between the pairs of half-banks, only one may send or receive data at a time. The global sense amplifier then latches the data from the global dataline and drives the data on the bankgroup global I/O through the I/O controller. The right and left I/O interfaces then serialize the 256-bit (128-bit each) data on the Bank-Group #0's global I/O before sending them through the 32-bit data I/O pins. By placing the accelerators inside the DRAM, the higher internal bandwidth of the DRAM can be exploited instead of relying on the lower bandwidth of the data I/O pins.

As shown in FIG. 4B, AXRAM integrates the accelerators into the GDDR5. Additionally, the accelerators use the aforementioned GDDR5 attributes to preserve the SIMT execution model and mitigate changes while providing data to all the arithmetic units each cycle.

B. In-DRAM Accelerator Integration

Figure 5:
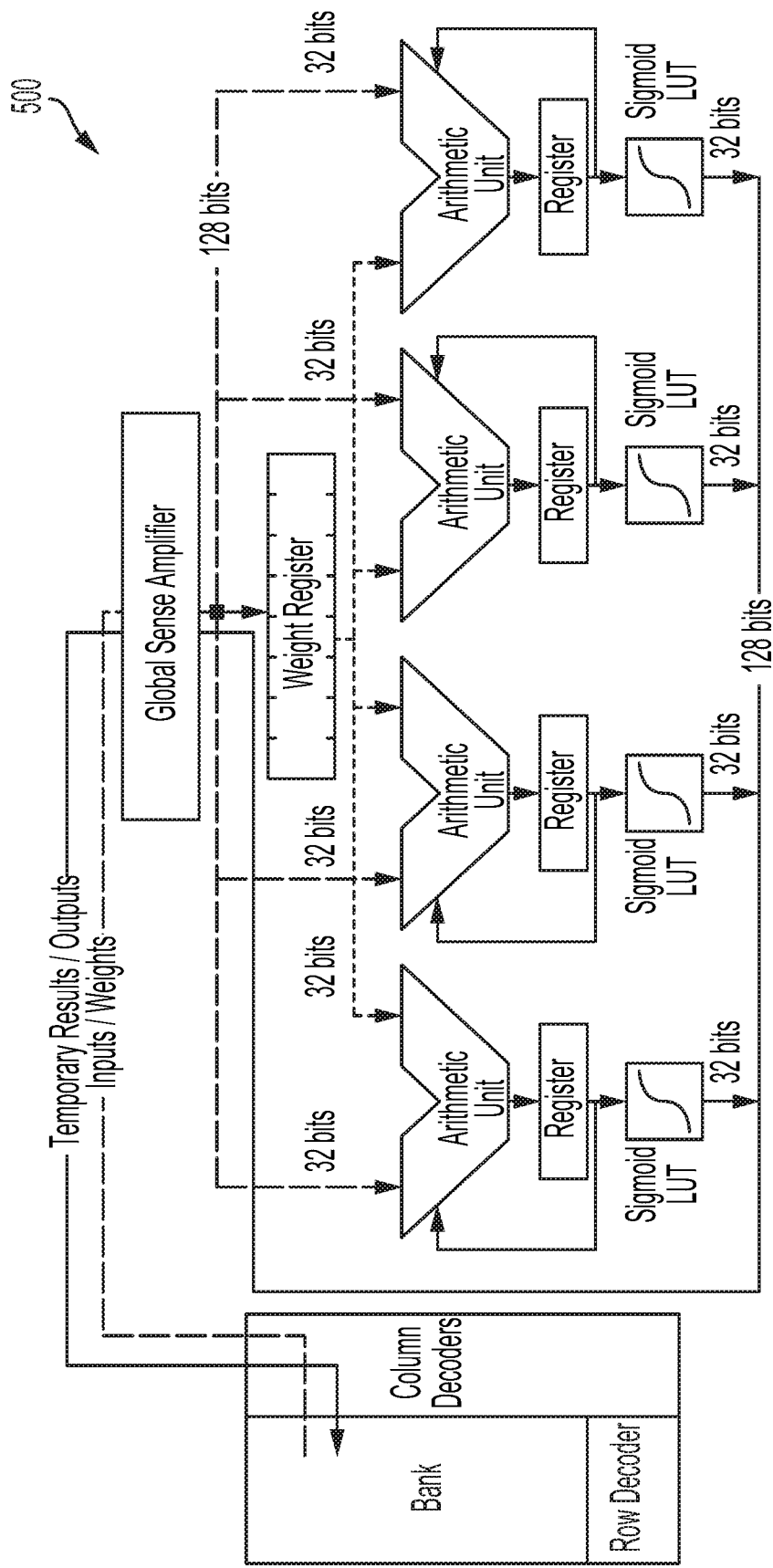
FIG. 5 illustrates the integration of weight register, arithmetic units, accumulation registers, and sigmoid LUTs, in accordance with example embodiments.

To minimize DRAM changes yet benefit from its high internal bandwidth, AXRAM integrates a set of arithmetic and sigmoid units within each half-bank group, as shown in diagram 500 of FIG. 5. These arithmetic and sigmoid units are connected to the half-bank groups' global sense amplifiers.

As mentioned, the accelerator is a set of arithmetic and sigmoid units. Each pair of arithmetic and sigmoid units is assigned to a thread of the neurally accelerated warp. The sigmoid units are implemented as a read-only LUT synthesized as combinational logic to minimize the area overhead.

SIMT execution of the neurally accelerated warp is guaranteed with these units. Each arithmetic unit can execute one MAC operation each clock cycle with a 32-bit input and 32-bit weight. The banks feed a 32-bit input to each of the integrated arithmetic units at the same time, such that the arithmetic units can perform the neural computation for all the threads within a warp simultaneously. As mentioned before, each bank-group in the baseline GDDR5 has a 256-bit wide global I/O, 128-bit per each half bank-group. Since each bank group can function independently, the DRAM can provide a total of 1024 bits (32×32 bits) of data from the banks at a time. Thus, 32 pairs of arithmetic and sigmoid units are integrated into each GDDR5 chip, 8 pairs per each bank-group. Other data organizations described below enable reading and writing 1024 bits of data simultaneously.

There are multiple design points for integrating arithmetic units within a GDDR5 chip. To minimize changes to the DRAM architecture, a desirable goal is to avoid modifying the underlying mat and bank design. A mat constitutes an array of 512×512 DRAM cells. Each mat comes with its own row decoder, datalines, and sense amplifiers.

One option is to add arithmetic units close to each half-bank to utilize their high internal bandwidth. However, this would require cutting the global datalines shared between pairs of half-banks (FIG. 4B) and adding a separate sense amplifier per half-bank. Therefore, this design point imposes a large area overhead and necessitates significant changes to each GDDR5 chip.

Another option is to add arithmetic units in a central manner close to the I/O interface in FIG. 4A. Although this option does not suffer from the drawbacks of placing the accelerators close to each half-bank, it requires extensive routing. Because the aforementioned options require such extensive modifications, they are undesirable design points.

Instead, AXRAM adds four arithmetic units per half bank-group after the shared sense amplifier within the I/O controller boundary, for a total of eight arithmetic units per bank-group. The accelerators' placement is illustrated in FIG. 4B, while the specific accelerator logic layout, including the arithmetic units, is shown in FIG. 5. This design choice imposes minimal changes to the DRAM architecture and avoids altering the design of the mats or banks.

Each of the arithmetic units implements the neural network MAC operations. However, to properly supply and retrieve data from the arithmetic units, storage is needed for the (1) inputs, (2) weights, (3) temporary results, and (4) outputs of the network. Generally, neural accelerators use dedicated buffers as storage. However, placing the arithmetic units near the data allows AXRAM to perform a series of design optimizations which minimize the modifications to the baseline GDDR5.

As FIG. 5 shows, AXRAM is able to instead use the GDDR5 banks as buffers. Input data is read directly from the GDDR5 banks and fed to the arithmetic units for processing. AXRAM leverages the large number of sense amplifiers within the DRAM banks to store temporary results in pre-allocated memory regions during in-DRAM computation. Outputs from the arithmetic units are written directly back to the GDDR5 banks. By not using dedicated buffers, there is no need to add large registers to each GDDR5 chip and reduce the area overhead. Only dedicated weight registers are added to supply weights to all the arithmetic units. This enables AXRAM to avoid having to read the weights from the memory banks each cycle and instead utilize the internal buses to supply all the arithmetic units with inputs. Thus, each arithmetic unit can be simultaneously provided with an input and weight each cycle.

Since all threads within a warp perform the computation of the same neuron in lock-step, the weights are the same among all the threads for a given neural network. Therefore, AXRAM can use one weight at a time and share it among the arithmetic units within a half-bank group. A weight register (shown in FIG. 5) is added per half bank-group, or for each group of four arithmetic units. The weights are pre-loaded into the weight register before the computation starts. If the number of weights exceeds the capacity of the register, the next set of weights is loaded after the first set has been depleted. This weight register has 8×32-bit entries per each half bank-group. Since each half bank-group can provide 128 bits of data at a time, the weight register should have at least four entries to fully utilize the provided bandwidth. An increase to the number of weight register entries allows computation to move forward while the next set of weights are loaded and avoid unnecessary stalls.

Adding arithmetic units to the half bank-groups increases the load to the half bank-groups' global I/Os. The only timing constraint affected by the increased load is the column access latency (tCL). To estimate the timing impact of tCL by HSPICE simulation, the increase in load due to the accelerator on the GIOs is measured after the placement and routing. Based on this evaluation, the extra loading on the half bank-groups' global I/Os increases the tCL by 20 picoseconds (ps). This increase is 0.16% of the typical value for tCL, which is around 12.5 nanoseconds (ns) to 15 ns, and is less than the guardband which accounts for various design variations. Thus, the 20 ps increase has virtually no effect on the timing of GDDR5.

The internal half bank-groups' global I/Os support two different modes: (1) normal mode and (2) in-DRAM acceleration mode. When the accelerator performs the computation, the half bank-group's global I/Os are connected to the arithmetic units to transmit input data. Once the computation of a neuron completes, the arithmetic unit inputs are disconnected from the half bank-group's global I/Os. The arithmetic units outputs are then connected to the global datalines through the global I/Os for storing the computed data into the memory banks. A series of pass transistors are used to control the connection between the inputs and outputs of the arithmetic units and the GDDR5 half bank-groups. Supporting a direct connection between the arithmetic units and the GDDR5 banks also requires additional routing paths in the DRAM. To enable the in-DRAM accelerator to gain access of the GDDR5 chip, the internal address/command bus is also modified. In normal mode, the on-chip memory controller has the full access of the address/command bus. However, in in-DRAM acceleration mode, the accelerator gains access to the address/command bus. A set of pass transistors supports this functionality in memory as well. The overhead of pass transistors and routing paths are evaluated below.

To orchestrate the flow of data in the banks to and from the in-DRAM accelerator, an in-DRAM controller is added. Furthermore, the on-chip memory controller is augmented with additional logic to translate the ISA extensions and properly initiate and configure the in-DRAM accelerator.

C. Interfacing the GPU with AXRAM

The on-chip memory controllers are extended to send invalidation signals to the on-chip caches upon receiving AXRAM instructions. Moreover, the on-chip memory controller is also extended to translate the AXRAM instructions to a sequence of special memory instructions. These memory instructions (1) configure the in-DRAM accelerator and (2) initiate the in-DRAM neural computation. The on-chip memory controller is augmented with customized address mapping logic to perform this translation.

Upon receiving AXRAM instructions, the implemented address mapping logic inside each on-chip memory controller sends a series of special memory commands to the in-DRAM accelerator to configure and initiate the in-DRAM acceleration. A one-bit flag is added inside each memory controller to keep track of the status of its corresponding GDDR5 chip. During in-DRAM neural computation, the flag is set so that the memory controller knows not to issue any further memory commands to the memory chip.

However, the memory controller may regain the ownership of the memory chip for performing mandatory memory operations such as refreshing. The memory controller sends a suspend command to the in-DRAM controller if the GDDR5 chip is in neural computation mode. Upon receiving the suspend command, the in-DRAM control unit stores any temporary results in the DRAM and stops computation. Once the refresh period finishes, the memory controller instructs the in-DRAM controller to continue the suspended neural computation.

Previous work has proposed integrating an on-DIMM controller and a handful of specialized microcontrollers in memory to accelerator associative computing. However, since the neural network does not require a complicated controller, a simple control unit is added inside each GDDR5 chip. This in-DRAM controller (1) marshals data and weights between memory banks and the in-DRAM accelerator and (2) governs the sequence of neural network operations. Specifically, it fetches input data from the banks and sends them to the arithmetic units, reads weights from memory and loads them into the weight buffers, and stores temporary results and neural output(s) into the banks. When the in-DRAM controller receives instructions from the on-chip memory controller, it gains full control of the internal DRAM buses. As discussed, the memory controller only re-gains ownership of the internal DRAM buses when neural computation completes and for performing mandatory memory operations such as random refreshing.

IV. SIMPLIFICATION OF ARITHMETIC UNITS

There are several options for the arithmetic units. The first option is to use floating-point arithmetic units to perform the neural computation. Another option is to use fixed-point arithmetic units for energy gains and a smaller area overhead. A third option is to approximate the arithmetic units to further reduce the area overhead and keep the impact on the overall DRAM system power low.

Figures 6A, 6B, 6C:
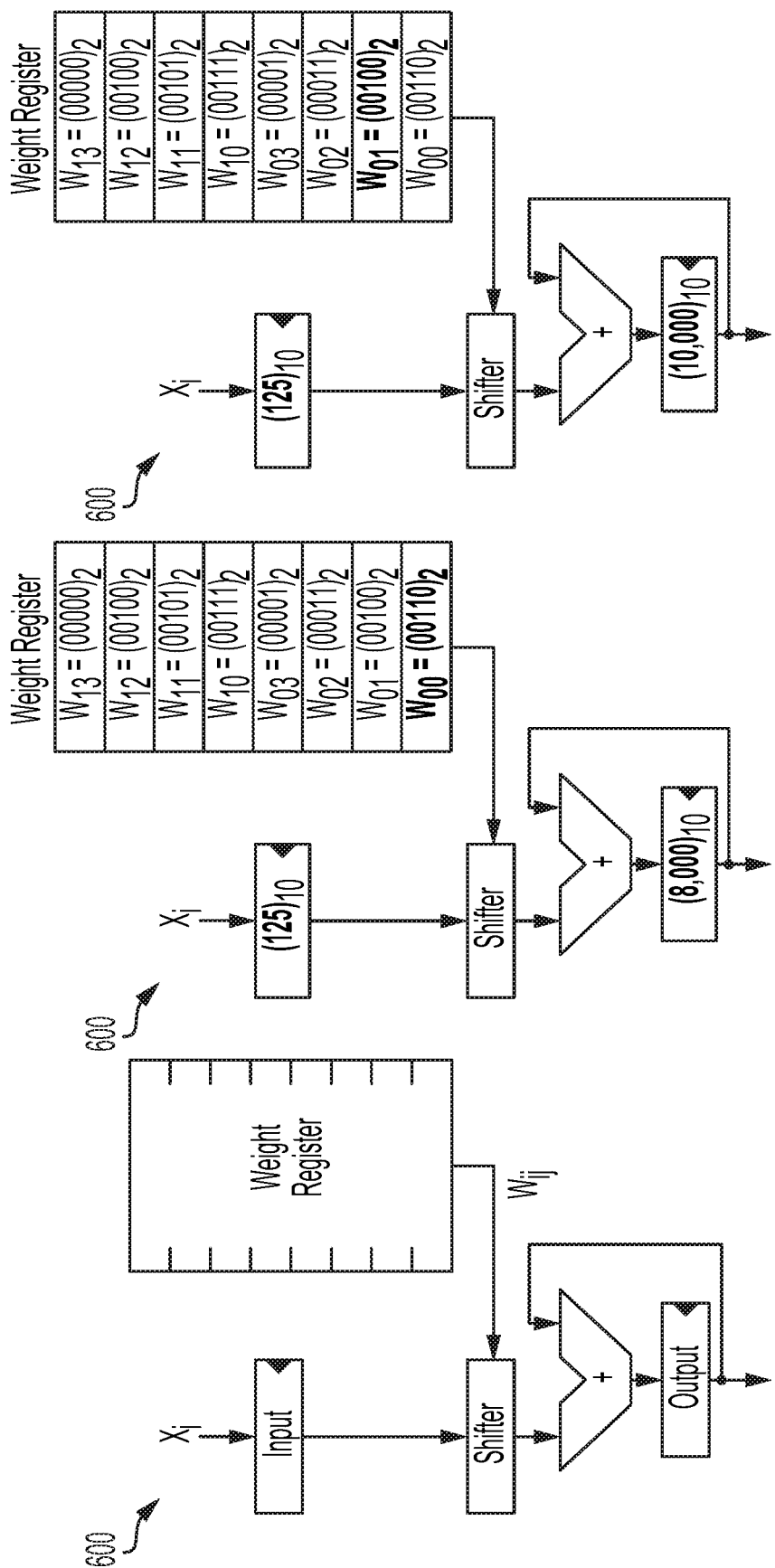
FIG. 6A illustrates an example of the simplified shift-add unit with pre-loaded shift amounts, in accordance with example embodiments.
FIG. 6B and FIG. 6C illustrate two iterations of the shift-add unit, in accordance with example embodiments.

The simplified arithmetic units of the third option break down the MAC operations into iterations of add and shift operations. More iterations of this shift-add unit offers higher precision at the expense of the throughput of the unit. Since the weights $W_i$ remain constant after training a neural network, the shift amounts can be pre-determined based off the bit indices of ones within the 32-bit weight value, starting with the most significant one. FIG. 6A shows an implementation 600 of this simplified shift-add unit. Variable $X_i$ represents the input of a neuron and variable $W_{i,j}$ is the shift amount for the $i^{th}$ weight in its $j^{th}$ iteration. The weight register stores these predetermined shift amounts. Since the shift amounts are indices of bits within a 32-bit weight value, the maximum shift amount is 32, which can be represented by a 5 bit value. Thus, each 32-bit entry in the weight register can hold a total of five shift amounts.

The design can be explained using an example in which $W_i=01011010_2$ ($90_{10}$) and $X_i=01111101_2$ ($125_{10}$). Multiple iterations of the simplified shift-add unit execution are shown in FIGS. 6B and 6C. The $W_i$ shift amount can be pre-determined by obtaining the bit index of the $j^{th}$ leading one of $W_i$. In this example, the most significant one in $W_i$ is in the sixth bit position (where bit positions are counted from the right of $W_i$, starting a 0), meaning $X_i$ is shifted by $W_{00}=6_{10}=110_2$, which is equivalent to multiplying by 64.

The result is then accumulated to the sum, which is initialized to zero. The first iteration (shown in FIG. 6B) yields $8000_{10}$, which achieves 71% accuracy to the actual sum $11250_{10}$.

More iterations leads to higher accuracy at the cost of higher energy consumption. The second (shown in FIG. 6C), third, and fourth iterations achieve 89%, 98%, and 100% (e.g. zero accuracy loss) accuracy, respectively. In the second iteration, $X_i$ is shifted by $W_{01}=4_{10}=100_2$, which is equivalent to multiplying by 16. This is added to the result to the first iteration to produce a partial sum of $10000_{10}$. In the third iteration, $X_i$ is shifted by $W_{02}=3_{10}=011_2$, which is equivalent to multiplying by 8. This is added to the result to the second iteration to produce a partial sum of $11000_{10}$. In the fourth iteration, $X_i$ is shifted by $W_{03}=1_{10}=001_2$, which is equivalent to multiplying by 2. This is added to the result to the third iteration to produce a final partial sum of $11250_{10}$.

The trade-offs between different arithmetic units for in-DRAM neural acceleration are described below.

V. DATA ORGANIZATION FOR AXRAM

The AXRAM architecture leverages bank-group level parallelism to supply all arithmetic units with inputs simultaneously. For this design to comply with the SIMT execution model, data is laid out in a specific order on a single GDDR5 chip. Proper data organization can improve the efficiency of near-data processing for certain applications. A neural network execution has consistent and predictable memory access patterns. AXRAM leverages the predictability of the memory access patterns in neural network execution to perform a series of data organization optimizations to fully utilize the inherent bank-group and bank-level memory parallelism in memory. The weights of the network are shared amongst all the threads and loaded into the weight register before in-DRAM neural computation, and the input data should be properly placed in memory.

A warp is logically divided into four partitions, each with eight threads. The data for all the eight threads of each partition is allocated within each bank-group. That is, the data for the first partition of threads (e.g. $thread_{0-7}$) is allocated to the first bank-group. Similarly, the data for $thread_{8-15}$, $thread_{16-23}$, $thread_{24-31}$ is allocated to the second, third, and fourth bank-group, respectively. If there is shared data between warps, it is replicated during the data partitioning. On average, the overhead of duplicated data is ≈2% in terms of storage.

Within a partition, the data should be organized in such a way that all the data for the 32 arithmetic units can be read and written simultaneously to efficiently utilize the bank-level parallelism. Specifically, AXRAM requires two constraints to be met for the data layout: (1) the row and column addresses of a given neuron's inputs for all the 32 threads have to be the same across the bank-groups and (2) the addresses of a neuron's inputs for each thread in a given partition have to be consecutive. Furthermore, similar to address mapping in baseline GPU, data for different neurons for a given partition is distributed among the banks to enable interleaving requests to different banks on the chip.

Figure 7:
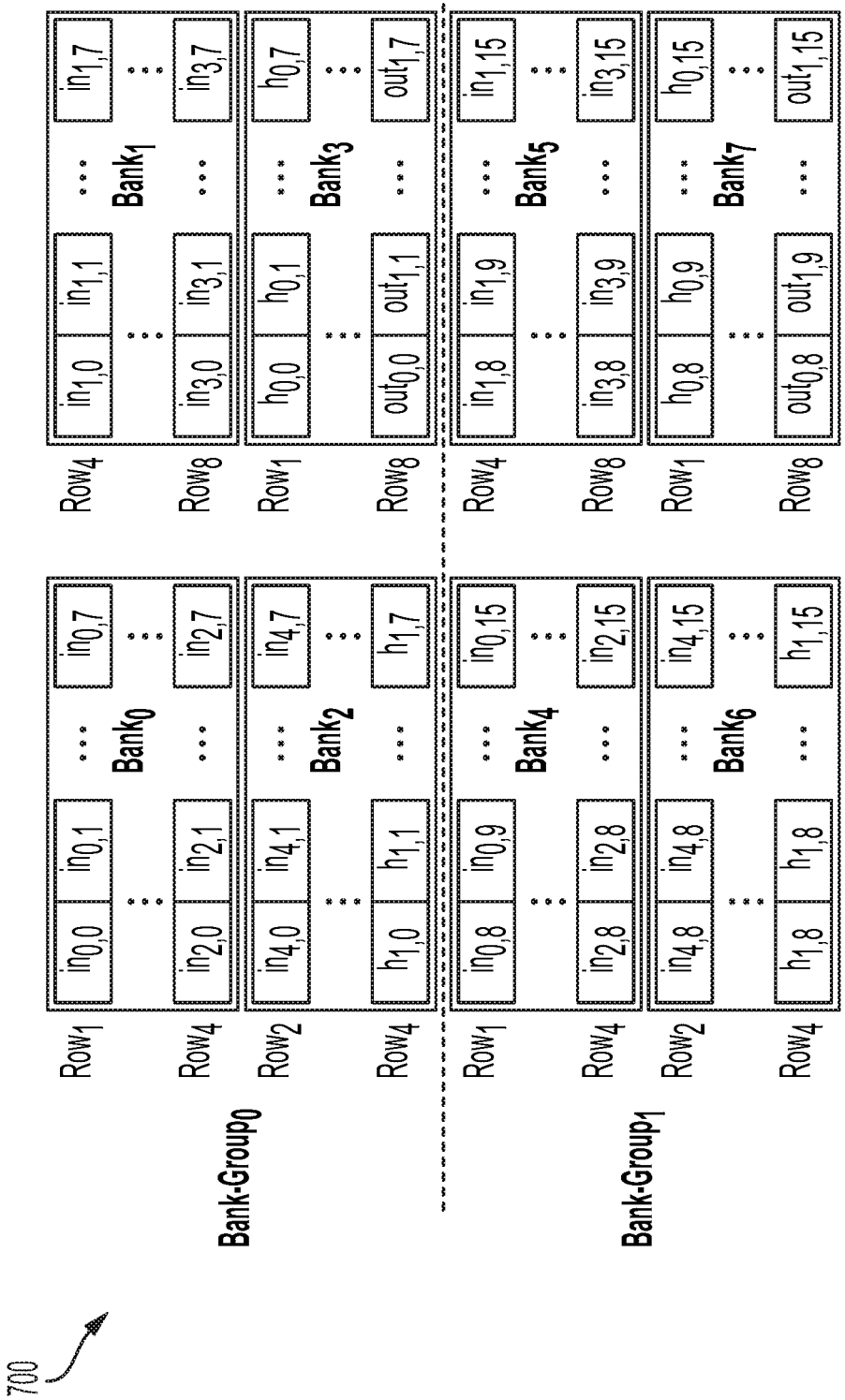
FIG. 7 illustrates the data layout for a neural network with $5 \rightarrow 2 \rightarrow 1$ configuration in bank-group$_0$ and bank-group$_1$ after data shuffling and with a row buffer with 256 bits.

FIG. 7 illustrates this scheme with an example 700, assuming a neural network topology with a 5→2→1 layer configuration. For simplicity, it is assumed that banks have 256-bit sense amplifiers and only the layout for $thread_{0-15}$ of a warp is shown. Input neuron i has an input $in_{i,j}$ for the $j^{th}$ thread. Similarly, $h_{i,j}$ and $out_{i,j}$ represent inputs for the $i^{th}$ hidden and output neuron, respectively, for the $j^{th}$ thread. Due to the first constraint, inputs for the $0^{th}$ input neuron for all threads are located in row$_1$ for both bank-groups. Following the second constraint, inputs in$_{0,0}$-in$_{0,7}$ and in$_{0,8}$-in$_{0,15}$ are consecutively placed in the same row in bank$_0$ and bank$_1$ respectively. The same constraints are met for the other neurons as well. Due to bank interleaving, inputs in$_{0,0}$-in$_{0,7}$ are stored in bank$_0$, while the inputs in$_{1,0}$-in$_{1,7}$ are in bank$_1$.

VI. MEMORY MODEL

The embodiments herein use a memory model that provides a single physical memory space divided into two separate and non-overlapping logical memory spaces for the GPU and in-DRAM neural accelerator respectively. The separation between the GPU and in-DRAM accelerator data and the proposed data partitioning and shuffling schemes are performed on-the-fly when the host transfers the data to the GPU memory during kernel initialization using customized memory management APIs. The CUDA Driver API (e.g. cuMemCopyHtoD( ), cuMemCopyDtoH( )) was modified to implement the proposed data organization optimizations (e.g. data partitioning and shuffling) for in-DRAM neural acceleration. The overhead of performing the proposed data organization optimizations is amortized over the long CUDA kernel execution time and is accounted for in the evaluation.

Current GPUs support simple virtual memory. AXRAM instructions use virtual addresses similar to CUDA instructions. Once a GPU core issues an AXRAM instruction, the virtual addresses are translated to physical addresses through translation lookaside buffers (TLBs)/page tables placed in the on-chip memory controllers, similar to other CUDA instructions. Then, the physical addresses are sent to the memory for in-DRAM neural computation. Virtual address support in AXRAM instructions expels the need to modify the underlying GPU virtual memory management system.

To fully utilize the inherent parallelism in memory, AXRAM may require that the data is allocated in a consecutive memory region. Most CUDA-enabled GPUs do not support on-demand paging. Thus, all the virtual memory locations are backed by actual physical memory before the kernel initialization. To guarantee that a contiguous virtual memory is translated to a consecutive physical memory, the proposed custom memory management API is used to copy the allocated data to consecutive physical pages before the kernel execution. Additionally, AXRAM may be extended to HSA-enabled GPUs. One potential solution is to raise a page fault exception if the data for an in-DRAM invocation is not in the memory. The in-DRAM accelerator may then stall until all the demanded pages are loaded into the memory.

Cache coherency is guaranteed in AXRAM. The AXRAM instructions bypass the on-chip caches and communicate directly with the on-chip memory controller. A GPU core always pushes all of its memory update traffic to memory before issuing any of the AXRAM instructions. Sending memory update traffic along with write-through policy used in most GPUs ensure that the in-DRAM accelerators have access to the most up-to-date data. The wrt_res.axram instruction is the only AXRAM instruction that updates the data in memory. Upon receiving this instruction and in order to guarantee cache coherency, the on-chip memory controller sends a series of invalidate signals to on-chip caches and nullify any cache block that will be updated by the offloaded in-DRAM computation. The invalidate signals ensure that GPU cores never consume stale data. On average, it takes ten cycles to invalidate all the cache lines related to one neural execution. Based on experimental evaluation, the overhead of sending the invalidate signals to guarantee cache coherency is, on average, only 1.9%.

The neural transformation does not introduce additional memory accesses to the approximable region. Therefore, there is no need to alter applications. AXRAM maintains the same memory consistency model as the baseline GPU.

VII. EVALUATION AND METHODOLOGY

AXRAM was evaluated with simplified shift-add units (AXRAM-SHA), fixed-point arithmetic units (AXRAM-FXP), and floating-point arithmetic units (AXRAM-FP).

TABLE 1

Applications, quality metrics, train and evaluation datasets, and neural network configurations.

| Application | | | Input Dataset | | Neural Network |
| --- | --- | --- | --- | --- | --- |
| Name | Domain | Quality Metric | Training | Evaluation | Topology |
| binarization | Image Processing | Image Diff. | Three 512 × 512 pixel images | Twenty 2048 × 2048 pixel images | 3→4→2→1 |
| blackscholes | Finance | Avg. Rel. Error | 8,192 options | 262,144 options | 6→8→1 |
| convolution | Machine Learning | Avg. Rel. Error | 8,192 data points | 262,144 data points | 17→2→1 |
| inversek2j | Robotics | Avg. Rel. Error | 8,192 2D coordinates | 262,144 2D coordinates | 2→16→1 |
| jmeint | 3D Gaming | Miss Rate | 8,192 3D coordinates | 262,144 3D coordinates | 18→8→2 |
| laplacian | Image Processing | Image Diff. | Three 512 × 512 pixel images | Twenty 2048 × 2048 pixel images | 9→2→1 |
| meanfilter | Machine Vision | Image Diff. | Three 512 × 512 pixel images | Twenty 2048 × 2048 pixel images | 7→4→1 |
| newton-raph | Numerical Analysis | Avg. Rel. Error | 8,192 cubic equations | 262,144 cubic equations | 5→2→1 |

TABLE 1-continued

Applications, quality metrics, train and evaluation datasets, and neural network configurations.

| Application | | | Input Dataset | | Neural Network Topology |
|---|---|---|---|---|---|
| Name | Domain | Quality Metric | Training | Evaluation | |
| sobel | Image Processing | Image Diff. | Three 512 × 512 pixel images | Twenty 2048 × 2048 pixel images | 9→4→1 |
| srad | Medical Imaging | Image Diff. | Three 512 × 512 | Twenty 2048 × 2048 pixel images | 5→4→1 |

As Table 1 shows, a diverse set of benchmarks from the AXBENCH suite was used to evaluate AXRAM. AXBENCH comes with annotated source code, the compiler for neural transformation, separate training and test data sets, and quality measurement toolsets. Table 1 shows the neural network topology automatically discovered by the AXBENCH compiler which replaces the annotated code region. Application-specific quality metrics provided by AXBENCH were used to assess the output quality of each application after in-DRAM acceleration. This quality loss is due to accumulated errors from repeated execution of the approximated region.

TABLE 2

Major GPU, GDDR5, and in-DRAM neural accelerator microarchitectural parameters.

| | |
|---|---|
| System Overview | 15 SMs, 32 threads/warp, 6 × 32-bit P2P memory channels |
| Shader Core | 1.4 GHz, 1,536 threads (48 warps), 32,768 registers, GTO scheduler, two schedulers/SM |
| L1 Data Cache | 16 KB, 128 B cache line, 4-way associative, LRU replacement policy |
| Shared Memory | 48 KB, 32 banks |
| Interconnect | 1 crossbar/direction (15 SMs, 6 MCs), 1.4 GHz |
| L2 Cache | 768 KB, 128 B cache line, 16-way associative, LRU replacement policy |
| Memory Model | 6 × GDDR5 Memory Controllers (MCs), Double Data Rate, ×32 mode, 64 columns. 4K rows, 256 bits/column, 16 banks/MC, 4 bankgroups, 2 KB row buffer/bank. Open row policy, FR-FCFS scheduling, 177.4 GB/Sec off-chip bandwidth |
| GDDR5 Timing | $t_{WCK}$ = 3,696 MHz, $t_{CK}$ = 1,848 MHz, $t_{CL}$ = 12, $t_{RP}$ = 12, $t_{RC}$ = 40, $t_{RAS}$ = 28, $t_{RCD}$ = 12, $t_{RRD}$ = 6, $t_{CDLR}$ = 5, $t_{WR}$ = 12, $t_{CCD}$ = 2, $t_{CCDL}$ = 3, $t_{RTPL}$ = 2, $t_{FAW}$ = 23, $t_{32AW}$ = 184 |
| GDDR5 Energy | RD/WR without I/O = 12.5 pJ/bit, Activation = 22.5 pJ/bit, DRAM I/O energy = 2 pJ/bit, Off-chip I/O energy = 18 pJ/bit |
| Arithmetic Unit Energy | 32-bit floating-point MAC = 0.14 nJ, 32-bit fixed-point MAC = 0.030 nJ, 32-bit approximate MAC = 0.0045 nJ, 32-bit register access = 0.9 pJ |

The GPGPU-Sim 3.2.2 cycle-level microarchitectural simulator was modified with the AXRAM ISA extensions. The latest configuration thereof models an NVIDIA® GTX 480 chipset with a Fermi architecture. For the memory timing, this configuration models the GDDR5 timing from Hynix. Additionally, the simulator was augmented to model the microarchitectural modifications in the GPU, the memory controller, and the GDDR5 for in-DRAM neural acceleration. The overheads of the extra instructions and logic in AXRAM, on-chip memory controller invalidate signals, and the data partitioning and shuffling are faithfully modeled. For all the baseline simulations that do not include any approximation or acceleration, a plain version of GPGPU-Sim was used.

Table 2 summarizes the microarchitectural parameters of the GPU and GDDR5 DRAM. NVCC 4.2 with -O3 was used to enable aggressive compiler optimizations. Furthermore, optimal kernel parameters were found, such as number of thread blocks and threads per block of each kernel, separately for each benchmark in the simulated architecture. In all the experiments, the applications were run to completion.

The Synopsys Design Compiler (J-2014.09-SP3) with a NanGate 45 nm library was used for synthesis and energy analysis of the architecture. Additionally, the Cadence SoC Encounter (14.2) was used for placement and routing. As DRAM technology has only three metal layers, naïvely taking the area numbers from the Synopsys Design Compiler underestimates the area. To account for this, the number of metal layers was restricted to three in Cadence SoC Encounter for I/O pins and routing.

The area overhead of the added hardware components were measured after the placement and routing stage with three metal layers. Similarly, for the added registers, the area was extracted after the placement and routing stage while restricting the number of metal layers to three. With this infrastructure, the proposed arithmetic units, in-DRAM controllers, routing multiplexers, bypass transistors, and sigmoid LUTs were analyzed.

To measure the energy numbers, GPUWattch was used. Also, the simulator was modified to generate an event log of the in-DRAM neural accelerator and all the other added microarchitectural components (i.e. number of neural accelerator invocations). The collected event logs were used to measure the energy of the in-DRAM neural acceleration. The energy evaluations use a NanGate 45 nm process node and 1.4 GHz clock frequency for the shader core (see Table 2 for further details). In-DRAM AXRAM changes were modeled using McPAT and CACTI 6.5. Since GPUWattch uses the results from McPAT and CACTI, the added energy models provide a unified and consistent framework for energy measurement.

A. Experimental Results

Figure 8A:
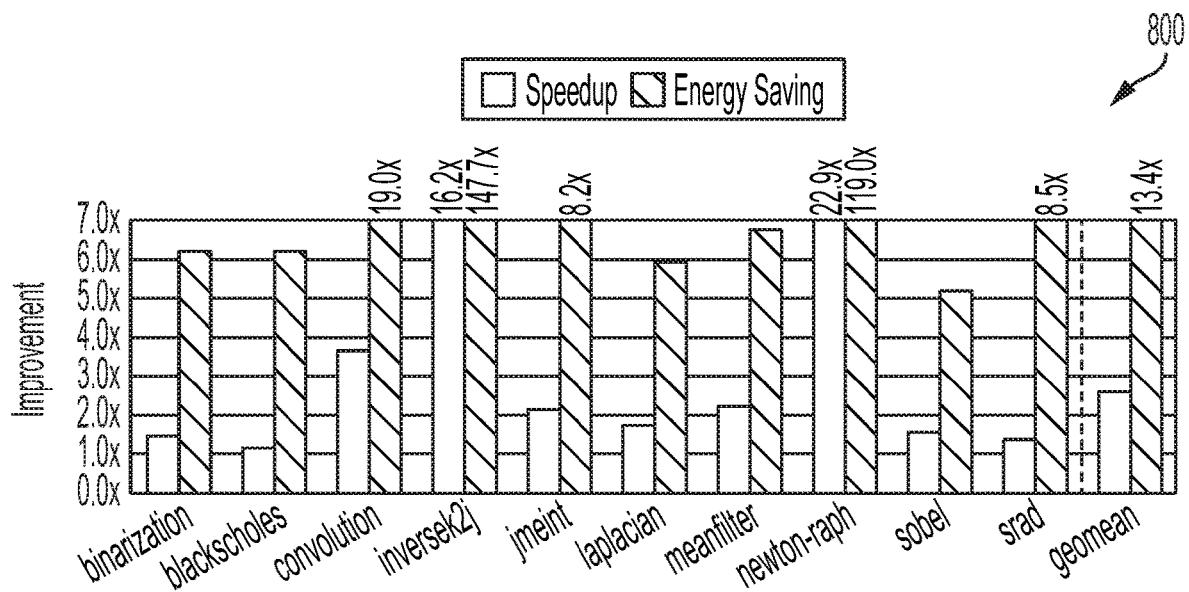
FIG. 8A illustrates the AXRAM-SHA application speedup and energy reduction of a baseline GPU, in accordance with example embodiments.
Figure 8B:
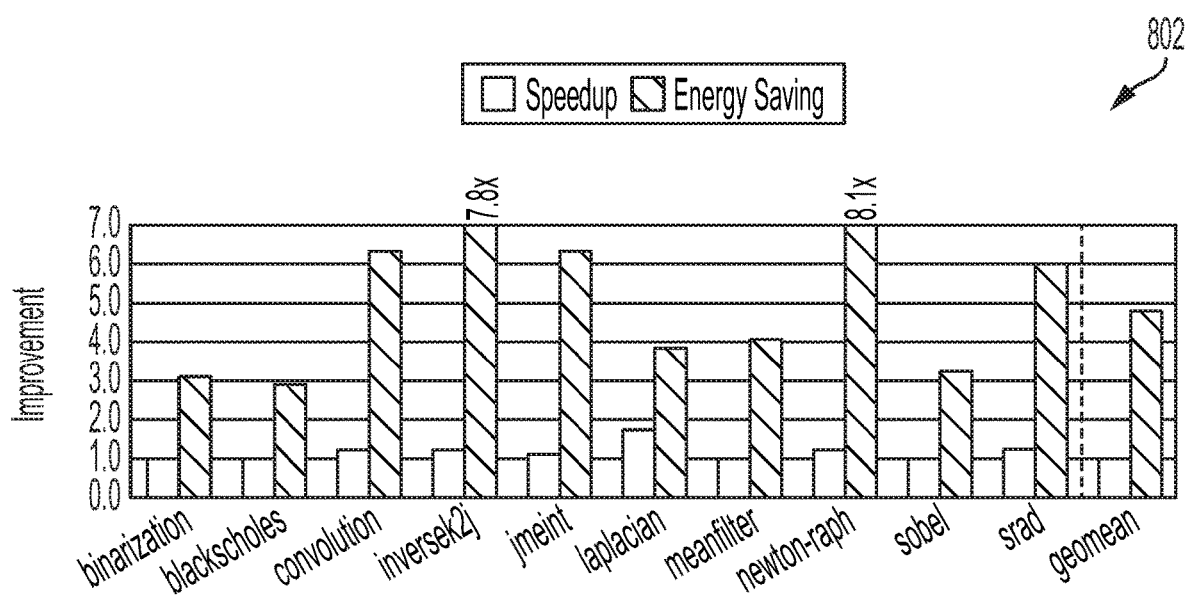
FIG. 8B illustrates the AXRAM-SHA application speedup and energy reduction of an accelerated GPU (NGPU), in accordance with example embodiments.

Charts 800 and 802 of FIG. 8A and FIG. 8B, respectively, show the whole application speedup and energy reduction when all the warps undergo approximation, normalized to a baseline GPU with no acceleration and an accelerated GPU (NGPU), respectively. The highest speedups are in inversek2j and newton-raph, where a large portion of their execution time is spent in an approximable region. The speedup with AXRAM-SHA compared to NGPU is modest, because in AXRAM-SHA, up to four iterations of shift and add operations are used. On average, AXRAM-SHA provides 2.6 time (1.1 times) speedup compared to GPU (NGPU).

FIG. 8A and FIG. 8B also show the energy reduction benefit of using AXRAM-SHA normalized to a baseline GPU and NGPU, respectively. The maximum energy reduction are in applications-inversek2j and newton-raph—with the highest contribution of off-chip data transfer to the whole application energy. The off-chip data transfer contribution in jmeint is also high (90%). However, this application has a large neural network topology (see Table 1), which leads to a higher number of accesses to the DRAM banks to read and write temporary data, diminishing the energy reduction. On average, the studied benchmarks enjoy 13.4 times (4.8 times) energy reduction compared to a baseline GPU (NGPU).

Figure 9:
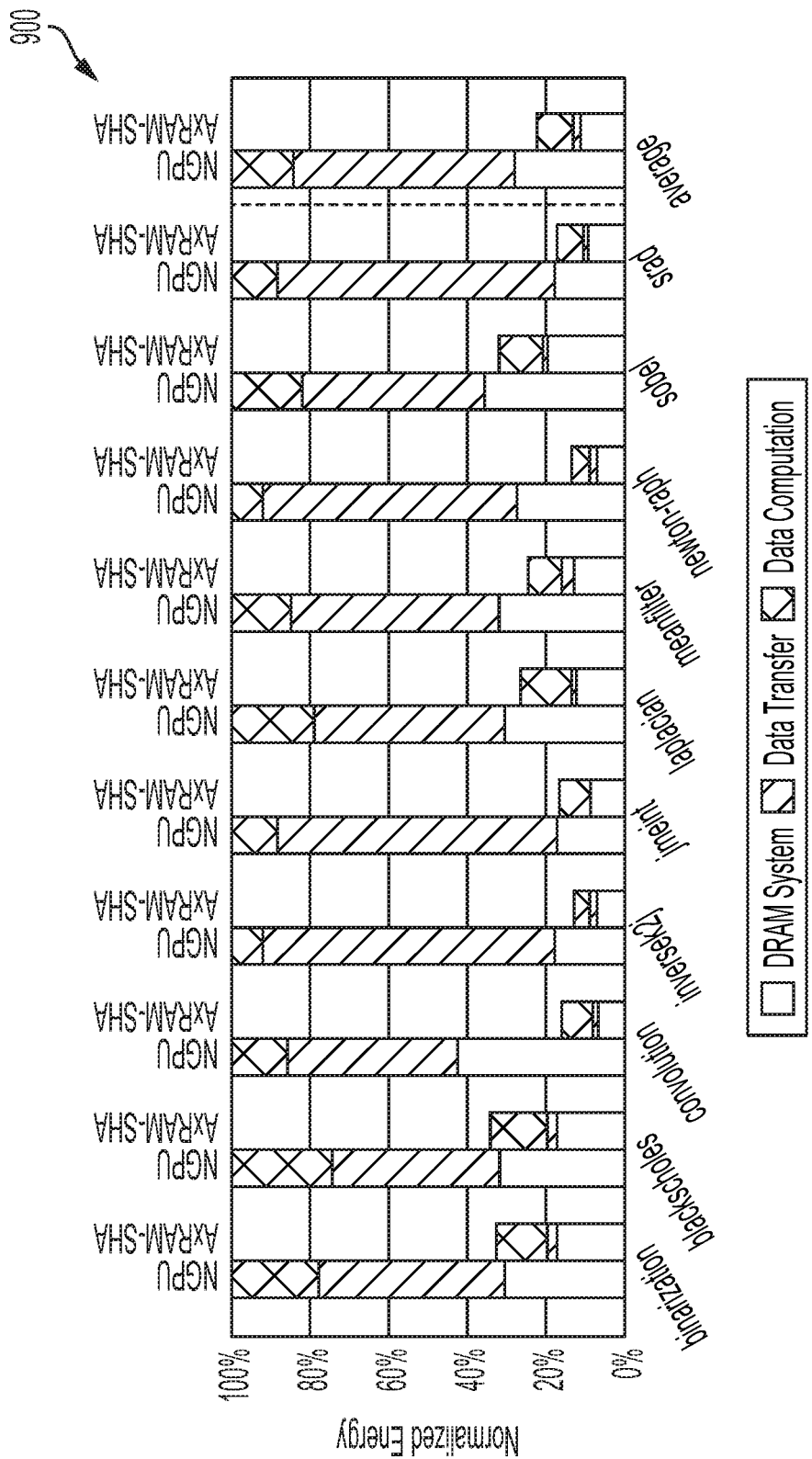
FIG. 9 illustrates the breakdown of AXRAM-SHA's energy consumption between DRAM system, data transfer, and data computation normalized to NGPU, in accordance with example embodiments.

To better understand the source of energy savings, chart 900 of FIG. 9 shows the energy breakdown of the DRAM system, data transfer, and data computation for AXRAM-SHA, normalized to NGPU. The first bar shows the breakdown of energy consumption in NGPU, while the second bar shows the breakdown of energy consumption in AXRAM-SHA normalized to NGPU.

As the first bar shows, the NPGU significantly reduces the contribution of the data computation in the overall system energy. Therefore, the contribution of the other main parts (e.g., data transfer and DRAM system) increases. The second bar illustrates how AXRAM-SHA significantly reduces the contribution of data transfer between the GPU cores and memory to the overall energy consumption of the system. On average, AXRAM-SHA reduces the energy consumption of data transfer by a factor of 18.5 times. AXRAM-SHA also reduces the average energy consumption of the DRAM system by a factor of 2.5 times due to (1) decreased I/O activity and (2) a higher row-buffer hit rate. Based on this evaluation, the proposed data organization improves the row-buffer hit rate by 2.6 times.

Finally, the use of simplified shift-add units reduces the average contribution of data computation to the whole application energy consumption by a factor of 1.7 times compared to NGPU. These results elucidate how AXRAM reduces the overall energy consumption compared to NGPU.

TABLE 3

Area overhead of the added major hardware components.

| Hardware Component | Area (mm$^2$) | |
| --- | --- | --- |
| | 8 Metal Layers | 3 Metal Layers |
| AXRAM-SHA (32 × 32-bit Approximate MACs) | 0.09 mm$^2$ | 0.15 mm$^2$ |
| AXRAM-FXP (32 × 32-bit Fixed-Point MACs) | 0.40 mm$^2$ | 0.76 mm$^2$ |
| AXRAM-FP (32 × 32-bit Floating-Point MACs) | 0.54 mm$^2$ | 0.97 mm$^2$ |
| 64 × 32-bit Weight Registers | 0.03 mm$^2$ | 0.06 mm$^2$ |
| 32 × Sigmoid LUT ROMs | 0.19 mm$^2$ | 0.34 mm$^2$ |
| In-DRAM Controller | 0.23 mm$^2$ | 0.4 mm$^2$ |

Table 3 shows the area overhead of the major hardware components added to each GDDR5 chip. The added hardware units were implemented in Verilog and synthesized with Design Compiler using the NanGate 45 nm library. Two or three generation older logic technology was used to have conservative estimations.

Then, Cadence SoC Encounter was used to perform the placement and routing on the synthesized designs. Cadence SoC Encounter was restricted to use only three metal layers, similar to the baseline GDDR5 layout, for both routing and I/O pins. The lower metal layer (M1) is used for VDD and GND, while the upper metal layers (M2 and M3) are used for routing and pins. The area of the chip was increased up to a point where no placement and routing violations are identified by Cadence SoC Encounter.

For the sake of comparison, the area overhead numbers were also obtained without placing any constraints on the number of metal layers in Cadence SoC Encounter. That is, Cadence SoC Encounter may use eight metal layers. As shown in Table 3, the area overhead with three metal layers is, on average, ≈1.9 times higher than with eight metal layers.

In total (including extra routing for power distribution and clock network), AXRAM-SHA consumes 1.28 mm$^2$ (2.1%) per each GDDR5 chip with a 61.6 mm$^2$ area. AXRAM-FXP and AXRAM-FP impose 2.0 times and 2.4 times higher area overhead compared to AXRAM-SHA.

Recent work has proposed the integration of CGRA-style accelerators atop commodity DRAM, either through TSVs or to the global I/Os. While such architectures are suitable for CPU workloads, where there are a limited number of threads, employing them for GPUs while preserving the SIMT execution model would require stacking 32 CGRAs (one per each thread in a warp). Based on the experimental evaluations herein, such an integration incurs ≈47.8% area overhead to each GDDR5 chip. Additionally, 1024 TSVs would be added to each GDDR5 chip, which is reported to incur ≈7% area overhead. In total, performing neural acceleration of the GPU with a stacked CGRA-like accelerator architecture would incur ≈55% area overhead. This large area overhead makes such integration an inefficient design point in GPUs. In contrast, the embodiments herein leverage approximation to integrate many simplified shift-add units inside each GDDR5 chip to enable in-DRAM acceleration.

Figure 10:
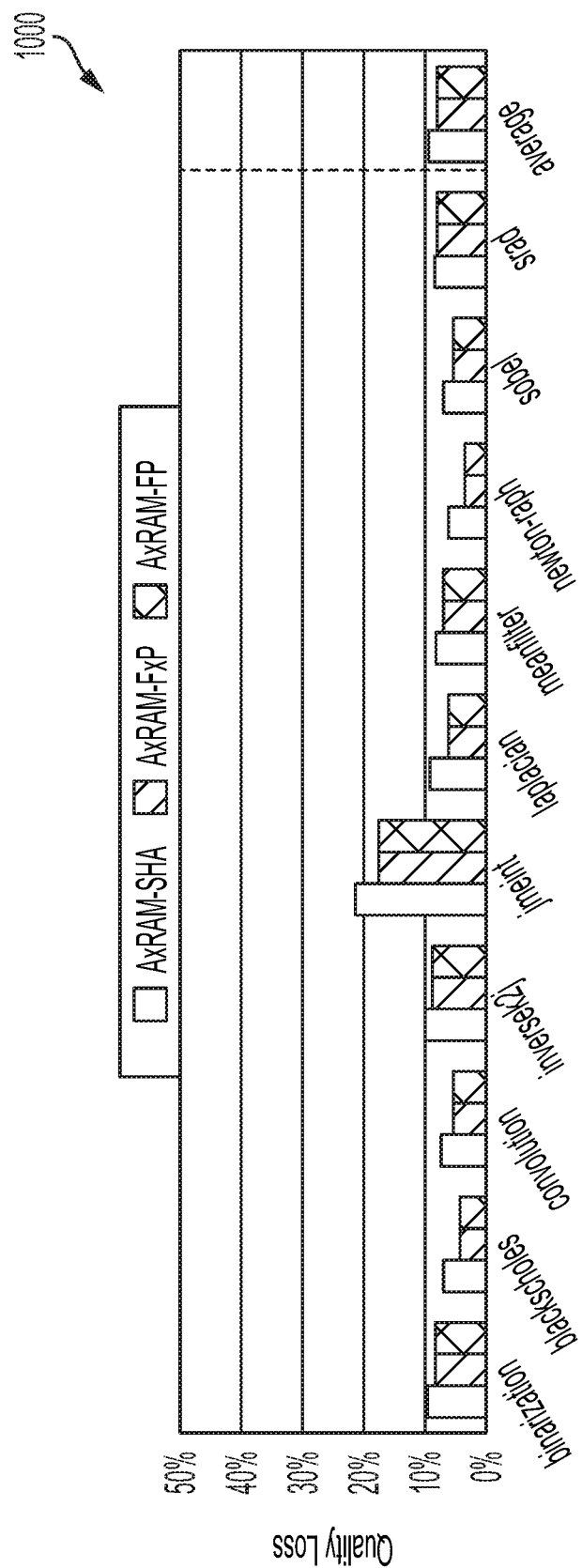
FIG. 10 illustrates the whole application quality loss with AXRAM-SHA, AXRAM-FXP, and AXRAM-FP compared to a baseline GPU, in accordance with example embodiments.

Chart 1000 of FIG. 10 shows the quality loss of AXRAM-SHA, AXRAM-FXP, and AXRAM-FP. The quality loss is compared with that of the original precise application executed on a baseline GPU with no acceleration and an unmodified DRAM. Using fixed-point arithmetic units in AXRAM-FXP has negligible impact on the quality loss compared to using floating-point arithmetic units in AXRAM-FP. Furthermore, the quality loss due to AXRAM-FP and AXRAM-FXP are the same as with NGPU. To achieve an acceptable output quality in AXRAM-SHA, up to four iterations of shift and add operations were used. On average, using AXRAM-SHA increases the output quality loss by 2.1% compared to the two other AXRAM microarchitectures.

Figure 11A:
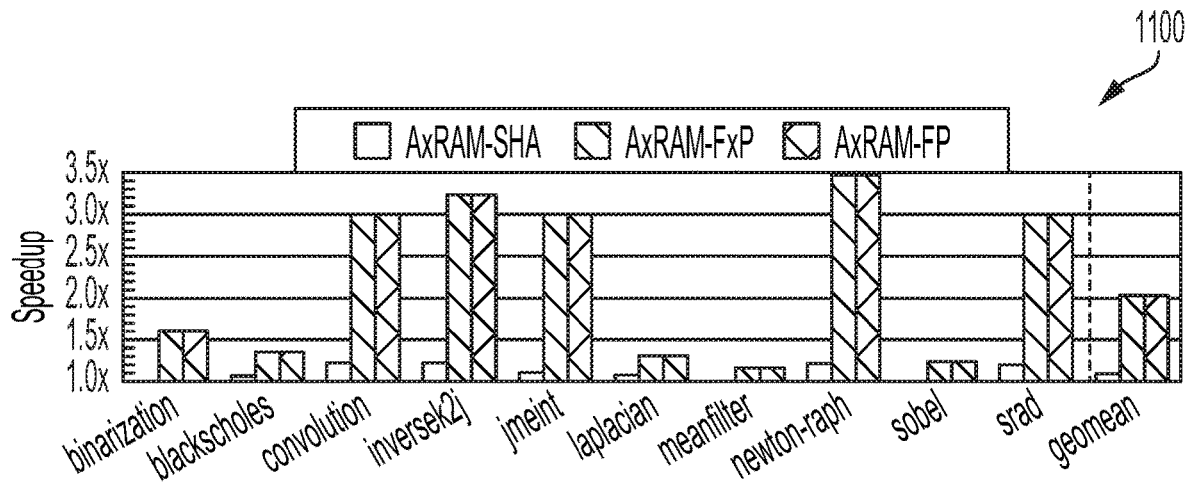
FIG. 11A illustrates the AXRAM application speedup with the different microarchitectural options compared to a neurally accelerated GPU (NGPU), in accordance with example embodiments.

A sensitivity study of AXRAM was performed with different arithmetic unit options. Chart 1100 of FIG. 11A compares the whole application speedup with AXRAM-SHA, AXRAM-FXP, and AXRAM-FP normalized to the NGPU. Since AXRAM-SHA performs multiple iterations of shifts and adds for each MAC operations its average speedup is less than the other two AXRAM microarchitectures. AXRAM-SHA, with multiple iterations per each multiply-accumulate operation, still provides a 1.1 times speedup on average among all the evaluated benchmarks. The same speedup applied across the evaluated applications for AXRAM-FP and AXRAM-FXP, which both take the same number of cycles to compute an in-DRAM neural accelerator invocation. On average, AXRAM-FP and AXRAM-FXP provide 2.0 times speedup for the evaluated benchmarks.

Figure 11B:
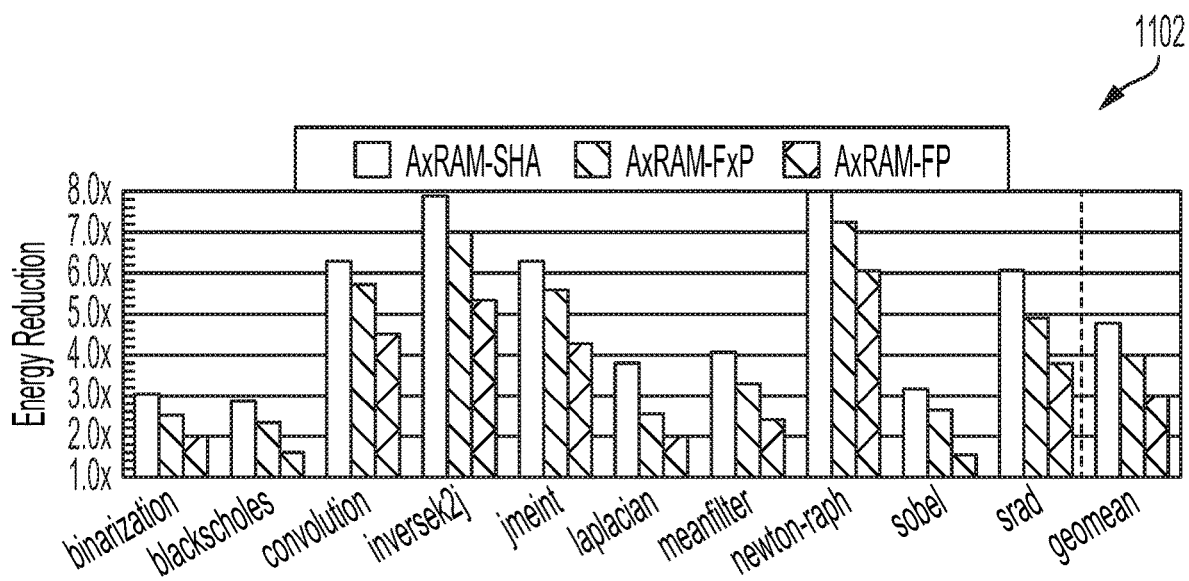
FIG. 11B illustrates the AXRAM application energy reduction with the different microarchitectural options compared to a neurally accelerated GPU (NGPU), in accordance with example embodiments.

Chart 1102 of FIG. 11B shows the whole application energy reduction of the three AXRAM options normalized to NGPU. On average, AXRAM-SHA achieves 4.8 times energy reduction, which is 1.6 times and 1.2 times more than that of AXRAM-FP and AXRAM-FXP, respectively. AXRAM-SHA achieves a higher energy reduction by simplifying the integrated arithmetic units and trading off the speedup and output quality loss.

Figure 12:
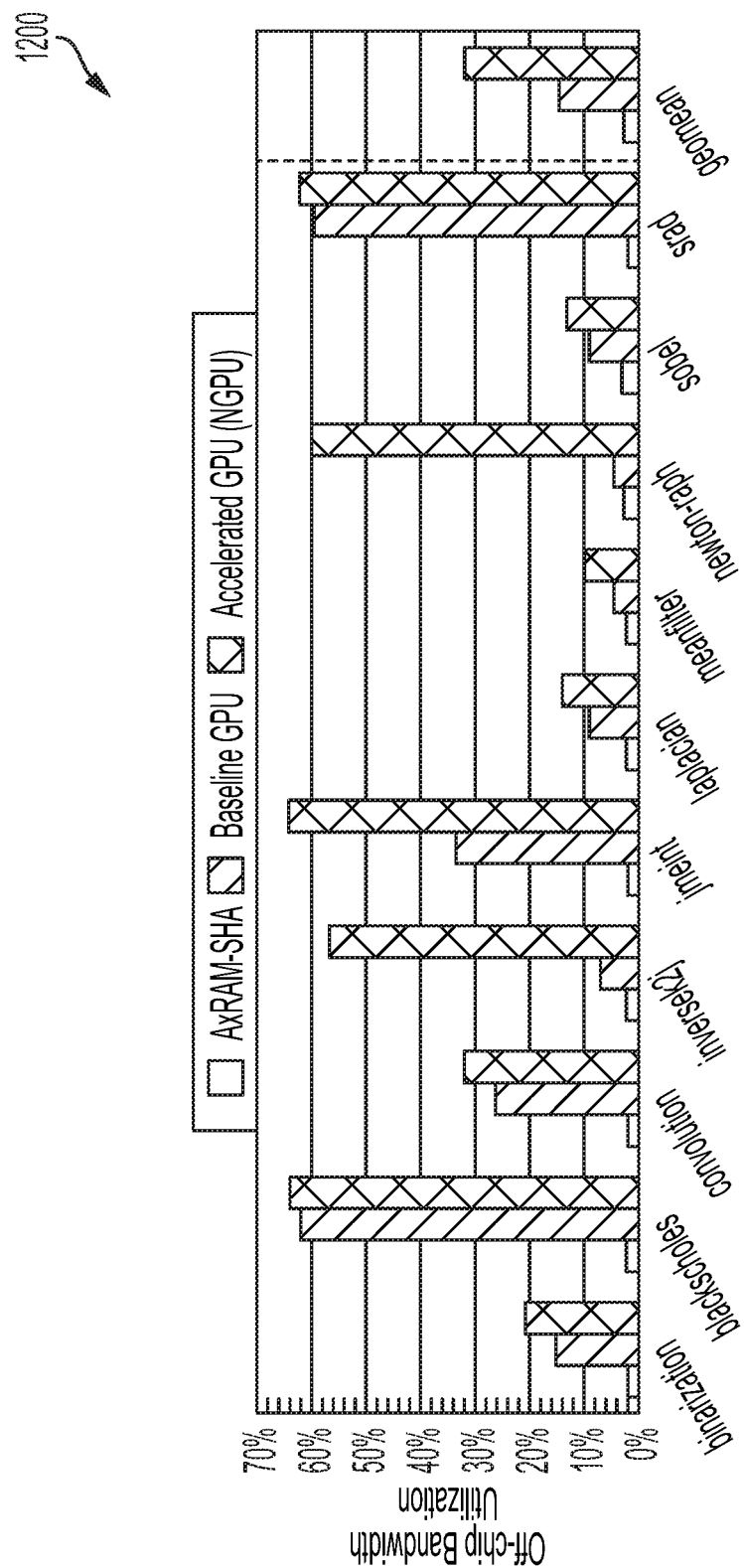
FIG. 12 illustrates the off-chip memory bandwidth consumption for AXRAM-SHA, a baseline GPU, and an accelerated GPU (NGPU), in accordance with example embodiments.

Chart 1200 of FIG. 12 analyzes the effect of using AXRAM-SHA on off-chip bandwidth utilization. The off-chip bandwidth of AXRAM-SHA is compared with a baseline GPU with no acceleration as well as an accelerated GPU (NGPU). While NGPU is able to accelerate the data processing part of GPU applications, it increases the off-chip bandwidth utilization by 2.2 times. However, AXRAM-SHA significantly reduces the off-chip bandwidth pressure by performing the neural computation near the data. This effectively eliminates most of the data transfer of the approximable region between the GPU cores and memory. Yet, there is still a small amount of communication between the GPU cores and memory for initializing the in-DRAM execution and transferring the control messages. On average, the AXRAM-SHA architecture is able to effectively reduce the off-chip bandwidth by a factor of 7.3 times (16 times) compared to a baseline GPU with no acceleration (NGPU).

Figure 13:
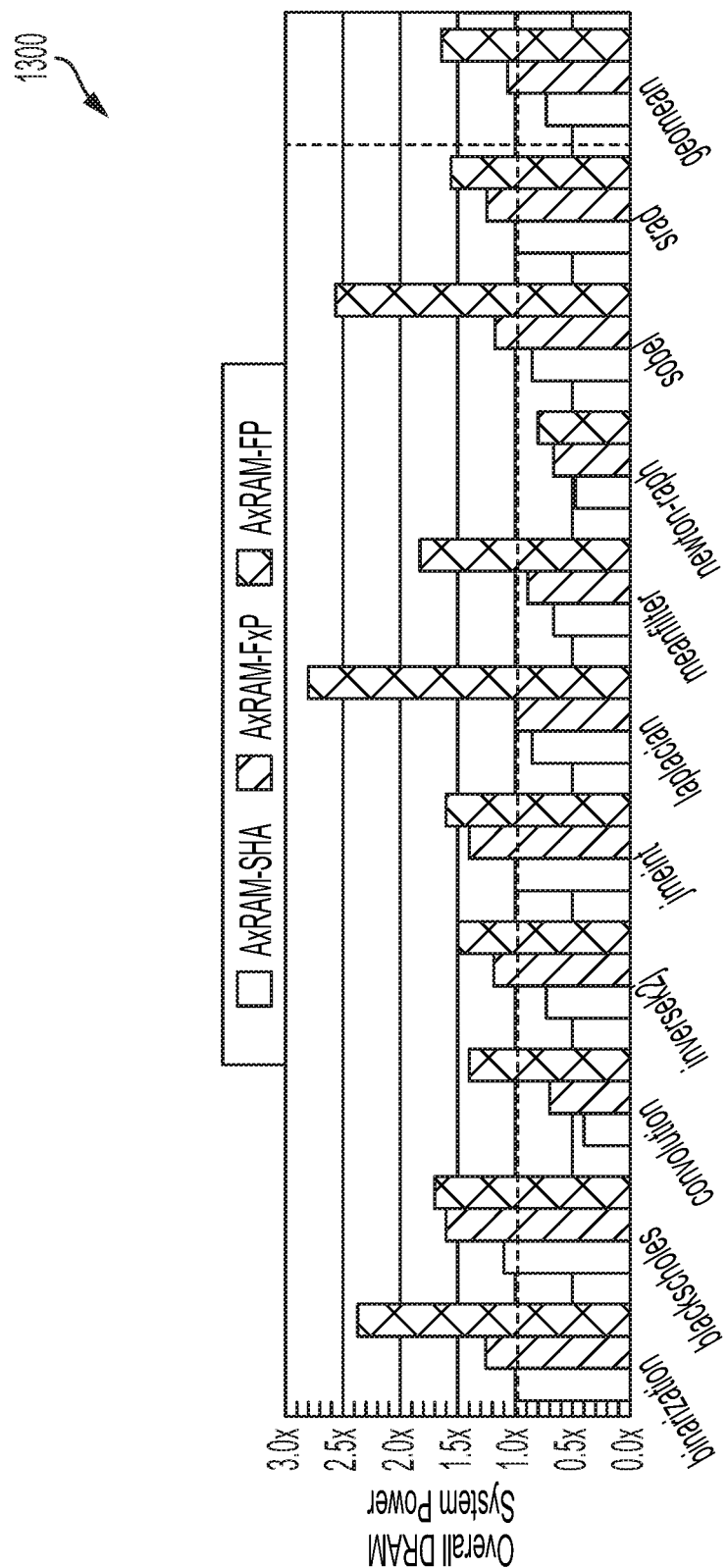
FIG. 13 illustrates the AXRAM average DRAM system power with the different microarchitectural options normalized to a baseline GPU, in accordance with example embodiments.

One of the objectives of the embodiments herein is to remain power neutral, such that the increase in power due to integrating the arithmetic units is offset by the decrease in overall DRAM system power due to the reduction in memory I/O activity and increased row-buffer hit rate. To determine if AXRAM is able to remain power neutral, the amount of increase in the average DRAM system power consumption is analyzed with three AXRAM options in chart 1300 of FIG. 13. The reduction in the data communication and the increase in row-buffer hit rate for all the three AXRAM (AXRAM-SHA, AXRAM-FP, and AXRAM-FXP) options is the same.

However, as the arithmetic units are simplified, the contribution of the in-DRAM accelerators to the overall system power decreases. AXRAM-FP and AXRAM-FXP increase the overall DRAM system power consumption by 66% and 5% on average, respectively. On the other hand, AXRAM-SHA with its simplified shift-add units effectively decreases the average overall DRAM system power consumption by 26%. These results show that using simplified shift-add units in AXRAM-SHA helps to reduce the overall DRAM system power significantly.

VIII. TECHNICAL IMPROVEMENTS AND ADVANTAGES

AXRAM is fundamentally different from prior proposals for processing in memory in two major ways: (1) instead of using 3D/2.5D-stacked technology, AXRAM builds upon the conventional graphics DRAM devices and (2) AXRAM tightly integrates approximate accelerators in memory. The design represents a convergence of two main bodies of research, namely approximate computing and processing in memory.

Several architectures have been proposed for neural acceleration. For example, prior work tightly integrated such neural accelerators with GPUs for significant improvement in performance and energy efficiency. However, the improvement of neurally accelerated GPUs quickly diminishes due to limited off-chip DRAM bandwidth. In contrast, AXRAM leverages the simplicity of the neural accelerator architecture to tightly integrate them with conventional graphics DRAM devices. This makes in-DRAM acceleration more practical and improves the gains from neural acceleration by overcoming the off-chip memory bandwidth wall. Prior to this work, the benefits, limits, and challenges of tight integration of neural accelerators in the conventional graphics DRAM devices was unexplored.

Traditional Processing In Memory (PIM) systems integrate logic and memory onto a single die to enable lower data access latency and higher memory bandwidth. These systems, however, suffer from high manufacturing cost, low yield, and limited mainstream adoption since memory and logic technologies are designed for different purposes. Recently, a wealth of architectures for PIM have been proposed, ranging from fully programmable to fixed-function, using 3D/2.5D stacking. A handful of recent work also studied the effect of data organization/mapping to improve the performance of near-data processing. Compared with the prior work, AXRAM makes in-DRAM processing more practical and efficient in heavily-threaded GPU systems by exploiting approximate computing.

IX. EXAMPLE OPERATIONS

Figure 14:
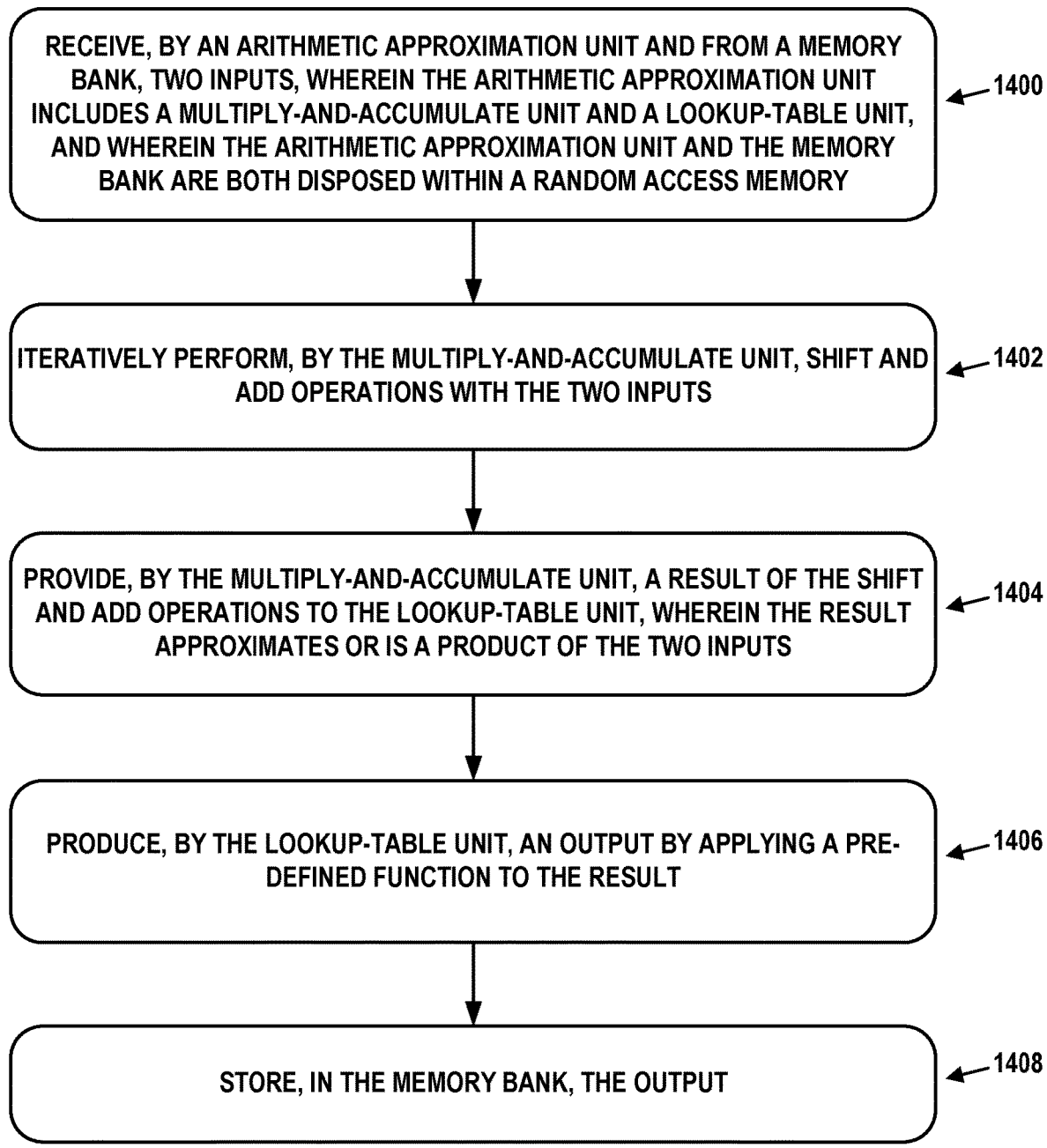
FIG. 14 is a flow chart, in accordance with example embodiments.

FIG. 14 is a flow chart illustrating an example embodiment. The process illustrated by FIG. 14 may be carried out by any of the memory arrangements described above in the context of FIGS. 2-6. However, the process can be carried out by other types of devices, modules, units, or subsystems.

The embodiments of FIG. 14 may be simplified by the removal of any one or more of the features shown therein. Further, these embodiments may be combined with features, aspects, and/or implementations of any of the previous figures or otherwise described herein.

Block 1400 may involve receiving, by an arithmetic approximation unit and from a memory bank, two inputs, wherein the arithmetic approximation unit includes a multiply-and-accumulate unit and a lookup-table unit, and wherein the arithmetic approximation unit and the memory bank are both disposed within a random access memory.

Block 1402 may involve iteratively performing, by the multiply-and-accumulate unit, shift and add operations with the two inputs.

Block 1404 may involve providing, by the multiply-and-accumulate unit, a result of the shift and add operations to the lookup-table unit, wherein the result approximates or is a product of the two inputs.

Block 1406 may involve producing, by the lookup-table unit, an output by applying a pre-defined function to the result.

Block 1408 may involve storing, in the memory bank, the output.

In some embodiments, the pre-defined function maps the result to a range between 0 and 1 inclusive or −1 and 1 inclusive. In some embodiments, the pre-defined function is monotonically increasing. In some embodiments, the pre-defined function is a sigmoid function.

In some embodiments, the memory bank is one of a plurality of memory banks, wherein the plurality of memory banks comprises four bank-groups each with four of the memory banks, and wherein each of the memory banks comprises two half-banks.

In some embodiments, the arithmetic approximation unit is one of a group of four arithmetic approximation units that is dedicated to two pairs of the half-banks. In some embodiments, the four arithmetic approximation units operate in parallel. In some embodiments, 128-bit datalines are shared between one of the pairs of the half-banks that is disposed within the memory bank. In some embodiments, receiving the two inputs comprises reading one of the two inputs as 32 bits on the 128-bit datalines. In some embodiments, storing the output comprises writing the output as 32 bits on the 128-bit datalines.

In some embodiments, the random access memory includes a weight register configured to store one of the two inputs for each of the four arithmetic approximation units.

In some embodiments, a first input of the two inputs is a represented as a series of shift amounts based on a jth leading one of the first input, and a second input of the two inputs is a multiplicand, wherein iteratively performing the shift and add operations comprises: initializing a cumulative sum register to be zero; and for each respective shift amount of the shift amounts, (i) bitwise shifting left the multiplicand by the respective shift amount, and (ii) adding the multiplicand as shifted to the cumulative sum register.

In some embodiments, receiving the two inputs comprises: receiving, from a processor, a first instruction and a second instruction, wherein the first instruction causes a memory controller disposed within the random access memory to read a first memory region containing configuration data for the arithmetic approximation unit, wherein the configuration data includes a first input of the two inputs, wherein the second instruction causes the memory controller to read a second memory region containing operands for the arithmetic approximation unit as configured by the configuration data, wherein the operands include a second input of the two inputs. In some embodiments, the configuration data defines a topology and weights of a neural network, and wherein the operands define input for the neural network. In some embodiments, the processor may be a graphical processing unit.

X. CONCLUSION

Near-data processing and approximate computing are two promising approaches to achieve higher performance and energy efficiency. This work developed AXRAM, a low-overhead accelerated memory architecture that represents the confluence of these two approaches. AXRAM delivers 1.1× speedup and 4.8× higher energy efficiency over even an accelerated GPU. AXRAM yields these benefits with less than 2.1% added area to each DRAM chip. These results confirm that approximation can play an enabling role for in-DRAM near-data acceleration and pave the way for its further intellectual development and technological adoption.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A random access memory comprising:
a plurality of memory banks, wherein the plurality of memory banks comprise four bank-groups each with four of the memory banks;
a plurality of arithmetic units, each associated with one or more of the memory banks, wherein the arithmetic units are configured to perform operations on respective inputs and to provide respective results of the operations, and wherein the arithmetic units are configured for parallel operation, wherein each of the memory banks comprises two half-banks, and wherein a group of four arithmetic units from the plurality of arithmetic units is dedicated to two pairs of the two half-banks; and
a memory controller configured to receive instructions, from a processor, regarding locations within the memory banks from which to obtain the respective inputs or in which to write respective outputs based on the respective results.

2. The random access memory of claim 1, wherein a plurality of lookup tables are associated pairwise with the plurality of arithmetic units and are each configured to perform a pre-defined function on the respective results to produce the respective outputs.

3. The random access memory of claim 2, wherein the pre-defined function maps each of the respective results to a range between 0 and 1 inclusive or −1 and 1 inclusive, wherein the pre-defined function is monotonically increasing, or wherein the pre-defined function is a sigmoid function.

4. The random access memory of claim 2, wherein respective registers are configured to store the respective results from the arithmetic units and to provide the respective results to the associated lookup tables.

5. The random access memory of claim 1, wherein 128-bit datalines are shared between one of the pairs of the two half-banks.

6. The random access memory of claim 5, wherein the respective inputs for each of the four arithmetic units is configured to be 32 bits read from the 128-bit datalines, and wherein the respective outputs for each group of four of the arithmetic units is configured to be 32 bits written to the 128-bit datalines.

7. The random access memory of claim 1, wherein the respective inputs each include two or more inputs, the random access memory further comprising:
a weight register configured to store one of the two or more inputs for each of the four arithmetic units.

8. The random access memory of claim 1, wherein the respective inputs each include two or more inputs, wherein a first input of the two or more inputs is represented as a series of shift amounts based on a jth leading one of the first input, and wherein a second input of the two or more inputs is a multiplicand, and wherein performing the operations comprises:
initializing a cumulative sum register to be zero; and
for each respective shift amount of the shift amounts, (i) bitwise shifting left the multiplicand by the respective shift amount, and (ii) adding the multiplicand as shifted to the cumulative sum register.

9. The random access memory of claim 1, wherein the respective inputs each include two or more inputs, wherein the instructions include a first instruction that causes the memory controller to read a first memory region containing configuration data for the arithmetic units, wherein the configuration data includes a first input of the two or more inputs, wherein the instructions include a second instruction that causes the memory controller to read a second memory region containing operands for the arithmetic units as configured by the configuration data, wherein the operands include a second input of the two or more inputs, and wherein the instructions include a third instruction that causes the memory controller to write the respective outputs to a third memory region.

10. The random access memory of claim 9, wherein the configuration data defines a topology and weights of a neural network, and wherein the operands define input for the neural network.

11. A method comprising:
receiving, by an arithmetic unit and from a memory bank of a plurality of memory banks, one or more inputs, wherein the arithmetic unit and the memory bank are both disposed within a random access memory configured for parallel operation of multiple arithmetic units, wherein the plurality of memory banks comprise four bank-groups each with four of the memory banks, wherein each of the memory banks comprises two half-banks, and wherein a group of four arithmetic units from a plurality of arithmetic units is dedicated to two pairs of the two half-banks;
performing, by the arithmetic unit, operations on the one or more inputs;
providing, by the arithmetic unit, a result of the operations; and
storing, in the memory bank, an output based on the result.

12. The method of claim 11, wherein the one or more inputs include two inputs, wherein a first input of the two inputs is a represented as a series of shift amounts based on a jth leading one of the first input, and wherein a second input of the two inputs is a multiplicand, and wherein performing the operations comprises:
initializing a cumulative sum register to be zero; and
for each respective shift amount of the shift amounts, (i) bitwise shifting left the multiplicand by the respective shift amount, and (ii) adding the multiplicand as shifted to the cumulative sum register.

13. The method of claim 11, wherein the one or more inputs include two inputs, wherein receiving the one or more inputs comprises:
receiving, from a processor, a first instruction and a second instruction, wherein the first instruction causes a memory controller disposed within the random access memory to read a first memory region containing configuration data for the arithmetic unit, wherein the configuration data includes a first input of the two inputs, wherein the second instruction causes the memory controller to read a second memory region containing operands for the arithmetic unit as configured by the configuration data, wherein the operands include a second input of the two inputs.

14. The method of claim 13, wherein the configuration data defines a topology and weights of a neural network, and wherein the operands define input for the neural network.

15. A system comprising:
a processor; and
a random access memory including: (i) a memory bank of a plurality of memory banks, wherein the plurality of memory banks comprise four bank-groups each with four of the memory banks, and (ii) a plurality of arithmetic units, each associated with one or more of the memory banks, wherein the arithmetic units are configured to perform operations on respective inputs and to provide respective results of the operations, wherein each of the memory banks comprises two half-banks, wherein a group of four arithmetic units from the plurality of arithmetic units is dedicated to two pairs of the two half-banks, and wherein the arithmetic units are configured for parallel operation; and (iii) a memory controller configured to receive instructions, from the processor, regarding locations within the memory bank from which to obtain the respective inputs and in which to write respective outputs based on the respective results.

16. The system of claim 15, wherein the respective inputs each include two or more inputs, wherein a first input of the two or more inputs is a represented as a series of shift amounts based on a jth leading one of the first input, and wherein a second input of the two or more inputs is a multiplicand, and wherein performing the operations comprises:
initializing a cumulative sum register to be zero; and
for each respective shift amount of the shift amounts, (i) bitwise shifting left the multiplicand by the respective shift amount, and (ii) adding the multiplicand as shifted to the cumulative sum register.

17. The system of claim 15, wherein the respective inputs each include two or more inputs, wherein the instructions include a first instruction that causes the memory controller to read a first memory region containing configuration data for the arithmetic units, wherein the configuration data includes a first input of the two or more inputs, wherein the instructions include a second instruction that causes the memory controller to read a second memory region containing operands for the arithmetic units as configured by the configuration data, wherein the operands include a second input of the two or more inputs, and wherein the instructions include a third instruction that causes the memory controller to write the respective outputs to a third memory region.

18. The system of claim 15, wherein the respective inputs each include two or more inputs, the system further comprising:
a weight register configured to store one of the two or more inputs for two or more of the arithmetic units.

19. A random access memory comprising:
a plurality of memory banks;
a plurality of arithmetic units, each associated with one or more of the memory banks, wherein the arithmetic units are configured to perform operations on respective inputs and to provide respective results of the operations, and wherein the arithmetic units are configured for parallel operation; and
a memory controller configured to receive instructions, from a processor, regarding locations within the memory banks from which to obtain the respective inputs or in which to write respective outputs based on the respective results, wherein the respective inputs each include two or more inputs, wherein a first input of the two or more inputs is represented as a series of shift amounts based on a jth leading one of the first input, and wherein a second input of the two or more inputs is a multiplicand, and wherein performing the operations comprises:
initializing a cumulative sum register to be zero; and
for each respective shift amount of the shift amounts, (i) bitwise shifting left the multiplicand by the respective shift amount, and (ii) adding the multiplicand as shifted to the cumulative sum register.

20. A random access memory comprising:
a plurality of memory banks;
a plurality of arithmetic units, each associated with one or more of the memory banks, wherein the arithmetic units are configured to perform operations on respective inputs and to provide respective results of the operations, and wherein the arithmetic units are configured for parallel operation; and
a memory controller configured to receive instructions, from a processor, regarding locations within the memory banks from which to obtain the respective inputs or in which to write respective outputs based on the respective results, wherein the respective inputs each include two or more inputs, wherein the instructions include a first instruction that causes the memory controller to read a first memory region containing configuration data for the arithmetic units, wherein the configuration data includes a first input of the two or more inputs, wherein the instructions include a second instruction that causes the memory controller to read a second memory region containing operands for the arithmetic units as configured by the configuration data, wherein the operands include a second input of the two or more inputs, and wherein the instructions include a third instruction that causes the memory controller to write the respective outputs to a third memory region.

* * * * *